United States Patent
Cyriac et al.

(10) Patent No.: US 12,413,812 B2
(45) Date of Patent: Sep. 9, 2025

(54) VIEWER REACTION DETECTION AND CONTENT CONTROL

(71) Applicant: Comcast Cable Communications, LLC, Philadelphia, PA (US)

(72) Inventors: Mary Cyriac, Warwick, PA (US); Christopher Day, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 14 days.

(21) Appl. No.: 18/166,057

(22) Filed: Feb. 8, 2023

(65) Prior Publication Data

US 2024/0267589 A1    Aug. 8, 2024

(51) Int. Cl.
| | |
|---|---|
| H04N 21/442 | (2011.01) |
| H04N 21/422 | (2011.01) |
| H04N 21/4223 | (2011.01) |
| H04N 21/462 | (2011.01) |
| H04N 21/466 | (2011.01) |
| H04N 21/81 | (2011.01) |

(52) U.S. Cl.
CPC . *H04N 21/44218* (2013.01); *H04N 21/42201* (2013.01); *H04N 21/42203* (2013.01); *H04N 21/4223* (2013.01); *H04N 21/462* (2013.01); *H04N 21/4663* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 10,135,632 B1* | 11/2018 | Roe | H04L 12/2816 |
| 11,368,751 B1* | 6/2022 | Dhiman | H04N 21/44218 |
| 2018/0249213 A1* | 8/2018 | Bostick | H04N 21/4532 |
| 2021/0204023 A1* | 7/2021 | Knox | H04N 21/42201 |
| 2023/0038347 A1* | 2/2023 | Rajanna | H04N 21/4756 |

* cited by examiner

*Primary Examiner* — Omar S Parra
(74) *Attorney, Agent, or Firm* — Banner & Witcoff, Ltd.

(57) ABSTRACT

Systems, apparatuses, and methods for detecting the reactions of primary and secondary viewers of content are described. Reactions of a primary or secondary viewer of content may be detected through use of a sensor and machine learning model. Based on the reaction of the primary or secondary viewer satisfying some criteria, outputting of the content may be modified and/or alternative content may be provided. Furthermore, metadata may be generated based on the detection of adverse reactions to intrusions by a viewer of content that is associated with an indication that the outputted content is associated with certain predefined types.

20 Claims, 10 Drawing Sheets

VIEWER REACTION DETECTION AND CONTENT CONTROL

BACKGROUND

Movie and television content may be associated with content ratings that indicate the viewership for whom the content is deemed suitable. For example, a television program may be preceded by an announcement of an age range of the intended audience of the television program. Such content ratings may apply to the entirety of content (e.g., an entire movie or episode of a television program) but may not indicate the exact parts at which potentially unsuitable content may be shown. Further, content ratings do not necessarily reflect the views of individual viewers which tend to vary from viewer to viewer. As such, content that one viewer deems suitable viewing for their own personal viewing may be deemed unsuitable by another viewer. As a result, a broad based content rating system may not meet the needs of individual viewers, especially those that wish to prevent certain types of content from being viewed by young children or unauthorized viewers.

SUMMARY

The following summary presents a simplified summary of certain features. The summary is not an extensive overview and is not intended to identify key or critical elements.

Systems, apparatuses, and methods are described for a reaction detection system that may modify (e.g., pause) the output of content based on the detection of reactions (e.g., surprised reactions) by a primary viewer (e.g., a parent viewing a television program on their personal tablet computing device) or secondary viewer (e.g., a child surreptitiously viewing the content that a parent is viewing without the parent being aware of the child's presence) of content. The disclosed technology allows for the automated control of content playback based on the detection of reactions by unauthorized viewers or the reactions of authorized viewers to the occurrence of intrusions including other viewers. Further, the reaction detection system may enrich existing metadata (e.g., closed captioning information) by generating additional metadata based on the detection of adverse viewer reactions during the outputting of content associated with metadata indicating portions of content associated with predefined types (e.g., provocative content comprising violence, vulgarity, and/or profanity). The reaction detection system may comprise a computing device (e.g., a smartphone) that is configured to detect viewer reactions based on the use of a machine learning model and a sensor (e.g., a camera). The reaction detection system may detect a primary viewer of content (e.g., a viewer that is authorized to playback content on a device) and a secondary viewer that is not the primary viewer. The reaction detection system may detect reactions of the primary viewer or secondary viewer. For example, the reaction detection system may detect the reaction of a primary viewer of content to an intrusion such as a door being opened or a child entering the room. Further, the reaction detection system may detect the reaction of a secondary viewer such as a secondary viewer's expression indicating that a secondary viewer is looking at the content being shown to the primary viewer. Based on the detection of a viewer reaction that satisfies certain criteria, the reaction detection system may modify the outputting of content and/or output alternative content (e.g., a commercial, a screen saver, or family friendly content) in lieu of the content that was previously being outputted. The disclosed technology may provide a more effective way to prevent content from being viewed without the permission of the primary viewer. Further, the disclosed technology may allow for greater flexibility and convenience when viewing content in areas that are accessible to parties other than the primary viewer of the content.

These and other features and advantages are described in greater detail below.

BRIEF DESCRIPTION OF THE DRAWINGS

Some features are shown by way of example, and not by limitation, in the accompanying drawings. In the drawings, like numerals may reference similar elements.

DETAILED DESCRIPTION

Figure 1:
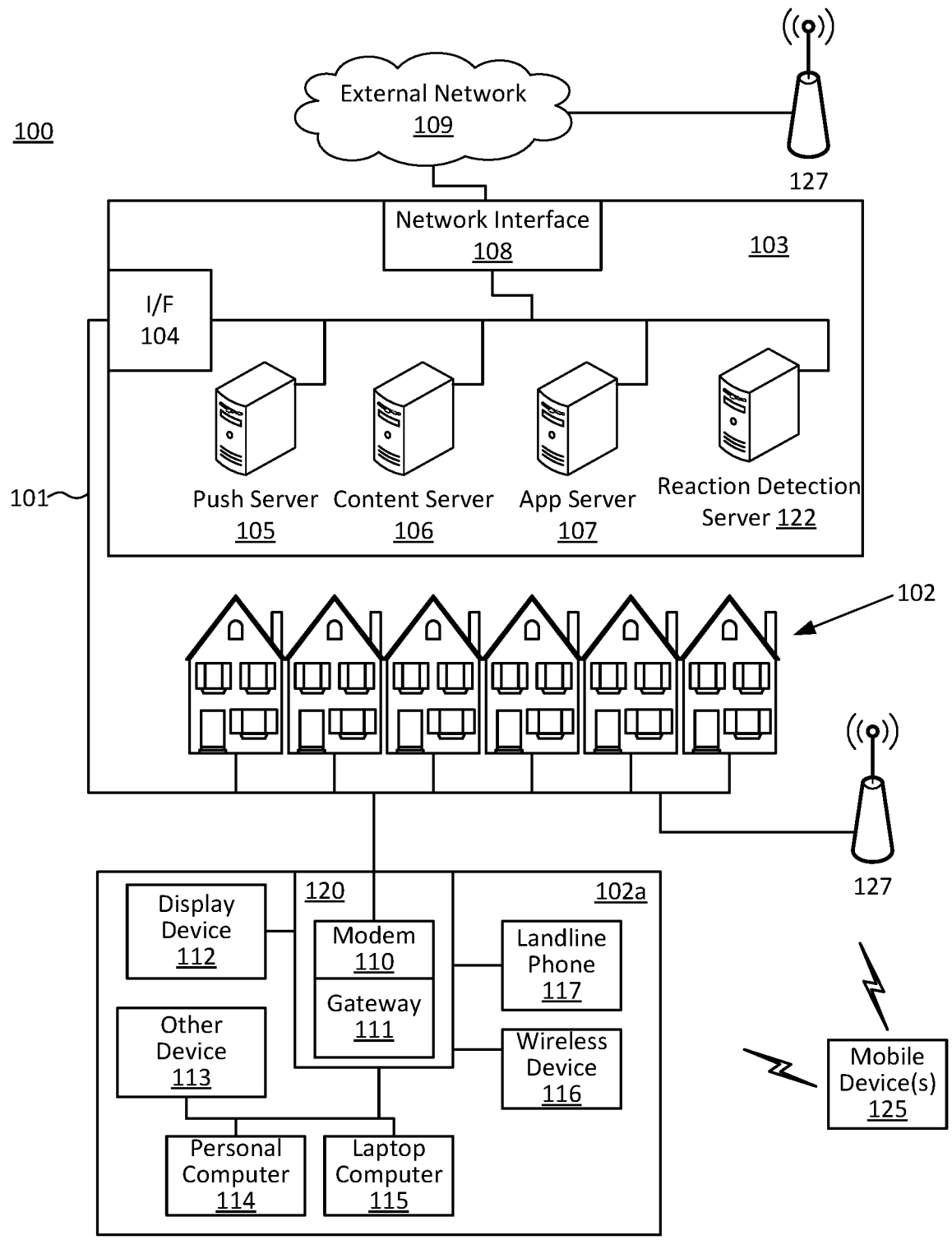
FIG. 1 shows an example communication network.

The accompanying drawings, which form a part hereof, show examples of the disclosure. It is to be understood that the examples shown in the drawings and/or described herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The one or more mobile devices 125 may comprise smart phones, tablets or laptop computers with wireless transceivers, wearable computing devices (e.g., a smart watch), tablets or laptop computers communicatively coupled to other devices with wireless transceivers, and/or any other type of device configured to communicate via a wireless network. For example, the one or more mobile devices 125 may comprise a smartphone that is used to view content (e.g., a video stream) that is transmitted to the smartphone via the one or more external networks 109, using a connection that is established between the smartphone and one or more of the servers 105-107 and reaction detection server 122.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The reaction detection server 122 may implement a reaction detection system that receives sensor data (e.g., sensor data based on camera sensor output from a smartphone camera or heart rate sensor output from a wearable device that is configured to detect a heart rate) from computing devices comprising the one or more mobile devices 125. Further, the reaction detection server 122 may, based on processing the received sensor data, modify (e.g., pause) the output of content that was being outputted to the one or more mobile devices 125. For example, the reaction detection server 122 may receive sensor data from the one or more mobile devices 125 via the one or more external networks 109. Based on the reaction detection server 122 detecting that a secondary viewer is viewing the content that is being outputted on a mobile device 125, the reaction detection server 122 may pause the outputting of the content. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the one or more mobile devices 125 via the interface 108 and one or more of the external networks 109, e.g., via one or more of the wireless access points 127.

The push notification server 105 may be configured to generate push notifications to deliver information to devices in the premises 102 and/or to the one or more mobile devices 125. The content server 106 may be configured to provide content to devices in the premises 102 and/or to the one or more mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the one or more mobile devices 125. The local office 103 may comprise additional servers, such as the reaction detection server 122 (described below), additional push, content, and/or application servers, and/or other types of servers. Also or alternatively, one or more of the push server 105, the content server 106, the application server 107, and/or the reaction detection server 123 may be part of the external network 109 and may be configured to communicate (e.g., via the local office 103) with computing devices located in or otherwise associated with one or more premises 102. Although shown separately, the push server 105, the content server 106, the application server 107, the reaction detection server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the one or more mobile devices 125, which may be on- or off-premises.

The one or more mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
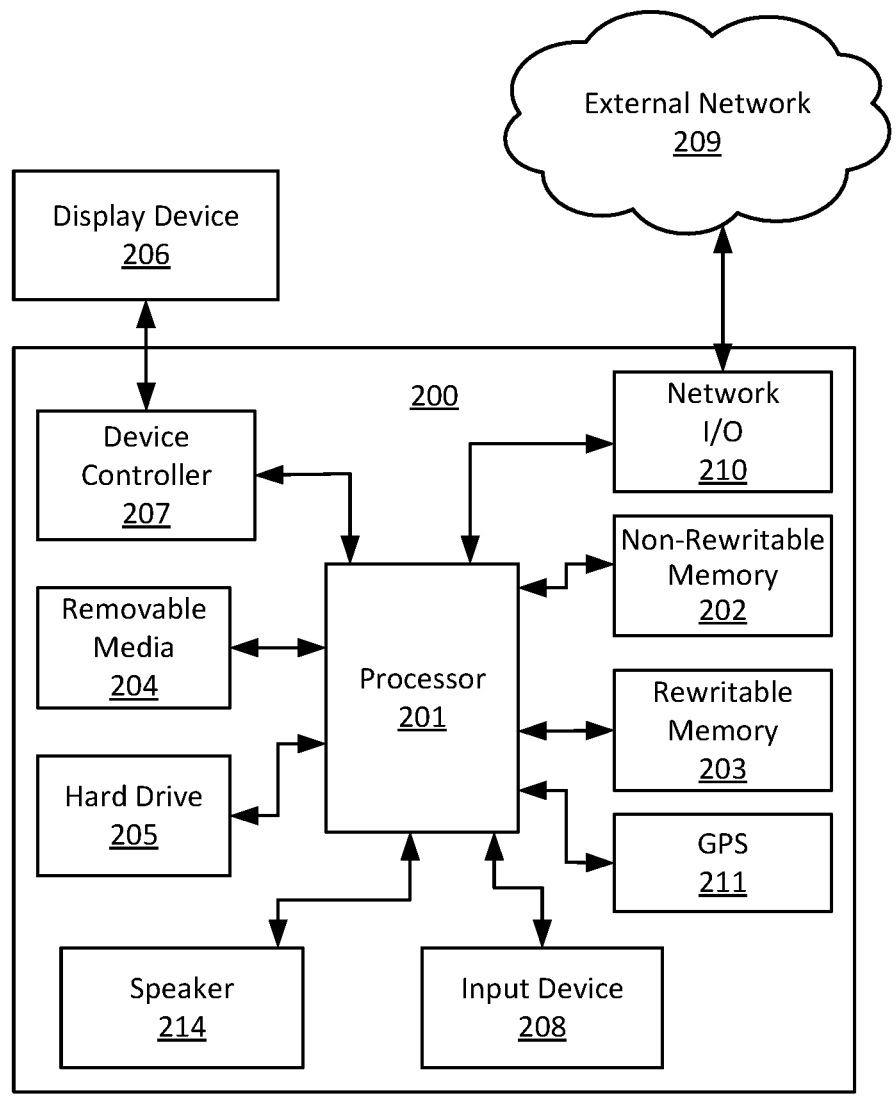
FIG. 2 shows hardware elements of a computing device.

FIG. 2 shows hardware elements of a computing device 200 that may be used to implement any of the computing devices shown in FIG. 1 (e.g., the one or more mobile devices 125, any of the devices shown in the premises 102a, any of the devices shown in the local office 103, any of the wireless access points 127, any devices with the external network 109) and any other computing devices described herein (e.g., the reaction detection server 122). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. The computing device 200 may comprise one or more user input devices 208. The one or more user input devices 208 may comprise a remote control, a keyboard, a mouse, a touch screen (which may be integrated with the display device 206), microphone, a camera, one or more buttons, etc. The computing device 200 may comprise one or more sensors. The one or more sensors may comprise a camera, a microphone, a motion sensor (e.g., an accelerometer), a thermal sensor, a heart rate sensor, and/or a tactile sensor. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 described above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
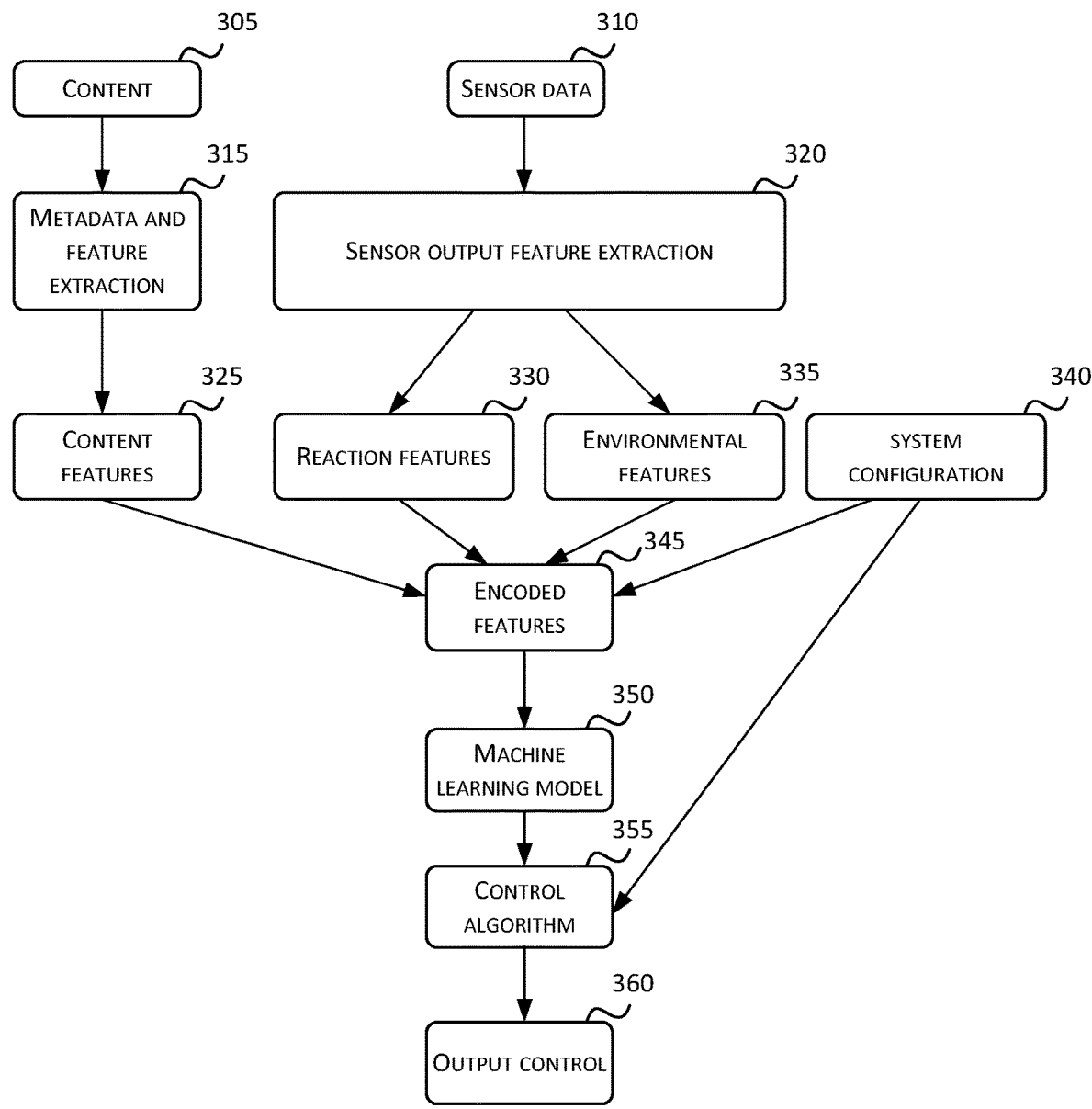
FIG. 3 shows an example of a machine learning model that is configured to detect viewers and viewer reactions.

FIG. 3 shows an example of a machine learning model that may be configured to detect viewers, viewer reactions, and/or intrusions, and that may be used for any of the machine learning models described herein. The machine learning model 350 may be implemented by any of the computing devices shown in FIGS. 1-2 (e.g., the one or more mobile devices 125, the reaction detection server 122) and/or any other computing device described herein. The machine learning model 350 may, for example, be implemented as one or more software applications executing one or more machine learning algorithms that has been trained and/or otherwise configured to carry out operations such as are described herein.

The content 305 may comprise data that may be processed and outputted via an output device (e.g., a display device). The content may comprise visual content such as video content and/or still image content; audio content; and/or metadata that comprises information associated with the content. For example, the content 305 may comprise a movie comprising video and audio that may transmitted to the one or more mobile devices 125 which may output the content 305 via output devices (e.g., display screen, speaker) of the one or more mobile devices 125. The metadata may comprise one or more indications associated with the content 305 including a transcription of speech in the content 305, descriptions of the content 305 at one or more time intervals, indications of one or more times at which restricted content (e.g., scenes of violence, nudity, vulgarity, and/or profane language) occur, a genre of the content (e.g., documentary, comedy, science-fiction, and/or action), and/or indications of the category of restricted content (e.g., an indication that the restricted content at a particular time is violent).

Metadata and feature extraction 315 may comprise operations to extract metadata that may be included in and/or associated with the content 305. For example, based on the content 305 comprising closed captioning information, metadata and feature extraction 315 may comprise operations to extract metadata comprising the closed captioning information from the content 305. Further, the metadata and feature extraction 315 may comprise operations to extract content features 325 (e.g., visual features and/or audio features) from the content.

The sensor data 310 may comprise data from one or more sensors that may be used to detect the state of one or more viewers and/or the environment surrounding the one or more viewers. For example, the sensor data 310 may be based on sensor outputs from sensors comprising a camera, a heart rate sensor, and/or a microphone. Further, the sensor data 310 may be based on the detection of a viewer of the content 305. For example, the sensor data 310 may be based on output from sensors including a camera and microphone of a tablet computing device that outputs the content 305 (e.g., a movie) to a viewer of the content 305. The sensor data 310 may comprise images of the viewer and/or sounds produced by the viewer as the viewer looks at and/or listens to the content 305.

Sensor output feature extraction 320 may comprise operations to extract features (e.g., visual features and/or aural features) from the sensor data 310. The features extracted from the sensor data 310 may include the reaction features 330 and/or the environmental features 335. The reaction features 330 may comprise one or more features associated with a reaction of a viewer. The reaction of a viewer may comprise a reaction of the viewer to the content 305, the presence of another viewer (e.g., a secondary viewer of the content 305), and/or an intrusion (e.g., a door being opened or a light being turned on). For example, the reaction features 330 may comprise features associated with a heart-rate of the viewer, facial expressions of a viewer or secondary viewer, exclamations by a viewer or secondary viewer, and/or gestures of a viewer or secondary viewer.

The environmental features 335 may comprise features associated with an environment detected by sensors that generate the sensor data 310. The environmental features 335 may comprise features of an environment comprising a primary viewer of the content 305. Further, the environmental features 335 may comprise features that do not include the primary viewer of the content. For example, the environmental features 335 may comprise features of other viewers (e.g., secondary viewers) and/or the area (e.g., a living room or office) in which the content is being outputted.

The system configuration 340 may comprise one or more options that may be used to select the features that are used as input to the machine learning model 350 and/or operations that will be performed based on output from the machine learning model 350 (e.g., pausing output of the content 305). For example, the system configuration 340 may be used to determine whether the machine learning model 350 may detect viewer reactions based on the viewer's heart-rate (e.g., an elevated heart-rate), facial expressions, or a combination of the two. Further, the system configuration 340 may be used to configure one or more criteria based on output from the machine learning model 350. For example, the system configuration 340 may be used to set a threshold heart-rate that may be used to pause output of the content 305 when a viewer's detected heart-rate exceeds the threshold heart-rate.

Encoded features 345 may be based on the content features 325, the reaction features 330, and/or the environmental features 335. The encoded features 345 may be based on processing the content features 325, the reaction features 330, and/or the environmental features 335 such that those features may be used as an input to the machine learning model 350.

The machine learning model 350 may be configured and/or trained to detect the state of objects in an environment (e.g., viewers in an environment including an output device configured to output content). Further, the machine learning model 350 may be configured to recognize facial expressions, spoken words, and/or gestures, determine the direction of a viewer's gaze, and/or determine changes in the state of an environment. Further, the machine learning model 350 may be configured and/or trained to detect one or more viewers (e.g., detect the presence of a primary viewer and/or secondary viewer), detect intrusions (e.g., a door being opened or a light being turned off), and/or detect reactions of the one or more viewers that may comprise a primary viewer and/or one or more secondary viewers (e.g., detect when a primary viewer glances at a secondary viewer or detect when a secondary viewer is looking at content). The machine learning model 350 may, for example, comprise one or more convolutional neural networks (CNNs), support vector machines (SVMs), and/or a Bayesian hierarchical model. The term machine learning model may be construed as one or more machine learning models any of which may operate singularly or in combination to perform the operations described herein.

Further, the machine learning model 350 may be trained using various training techniques including supervised learning, unsupervised learning, semi-supervised learning, and/or reinforcement learning. The machine learning model 350 may, for example, comprise parameters that have adjustable weights and fixed biases. As part of the process of training the machine learning model 350, values associated with each of the weights of the machine learning model 350 may be modified based on the extent to which each of the parameters contributes to increasing or decreasing the accuracy of output generated by the machine learning model 350. For example, parameters of the machine learning model 350 may correspond to various visual features and/or aural features. Over a plurality of iterations, and based on inputting training data (e.g., training data comprising features similar to the encoded features 345) to the machine learning model 350, the weighting of each of the parameters may be adjusted based on the extent to which each of the parameters contributes to accurately determining viewer reactions to content, other viewers, and/or the state of an environment surrounding a viewer.

Training the machine learning model 350 may comprise the use of a cost function that is used to minimize the error between output of the machine learning model 350 and a ground-truth value. For example, the machine learning model 350 may receive input comprising training data similar to the encoded features 345. The training data may comprise features of primary viewers and/or secondary viewers of content. Further, the training data may comprise ground truth information that indicates whether a secondary viewer is looking at content that is being viewed by a primary viewer. Accurate output by the machine learning model 350 may include accurately determining that a secondary viewer is looking at content or not looking at content. Inaccurate output by the machine learning model 350 may include determining that a secondary viewer is looking at content when the secondary viewer is not looking at content or determining that a secondary viewer is not looking at content when the secondary viewer is actually looking at content. Over a plurality of training iterations, the weighting of the parameters of the machine learning model 350 may adjusted until the accuracy of the machine learning model's output reaches some threshold accuracy level (e.g., 99% accuracy). Further, the output of the machine learning model 350 may comprise one or more scores associated with the reactions of a viewer (e.g., a primary viewer), one or more secondary viewers, and/or an intrusion. For example, a score may be associated with the probability that a secondary viewer is looking at content, a probability that a primary viewer is startled, or a probability that a door has been opened.

The control algorithm 355 may be used to determine whether the output (e.g., a viewer reaction score) of the machine learning model 350 has satisfied some criteria. Based on the output by the machine learning model 350 satisfying the criteria (e.g., a threshold score has been exceeded), the output control 360 may perform some operation with respect to the content 305 (e.g., stop outputting the content 305). Further, the output control 360 may be configured to perform some other operations including modifying output of the content 305 by reducing the volume of content that is being outputted and/or outputting some alternative content (e.g., a different program that is suitable for viewers of all ages).

Figure 4A:
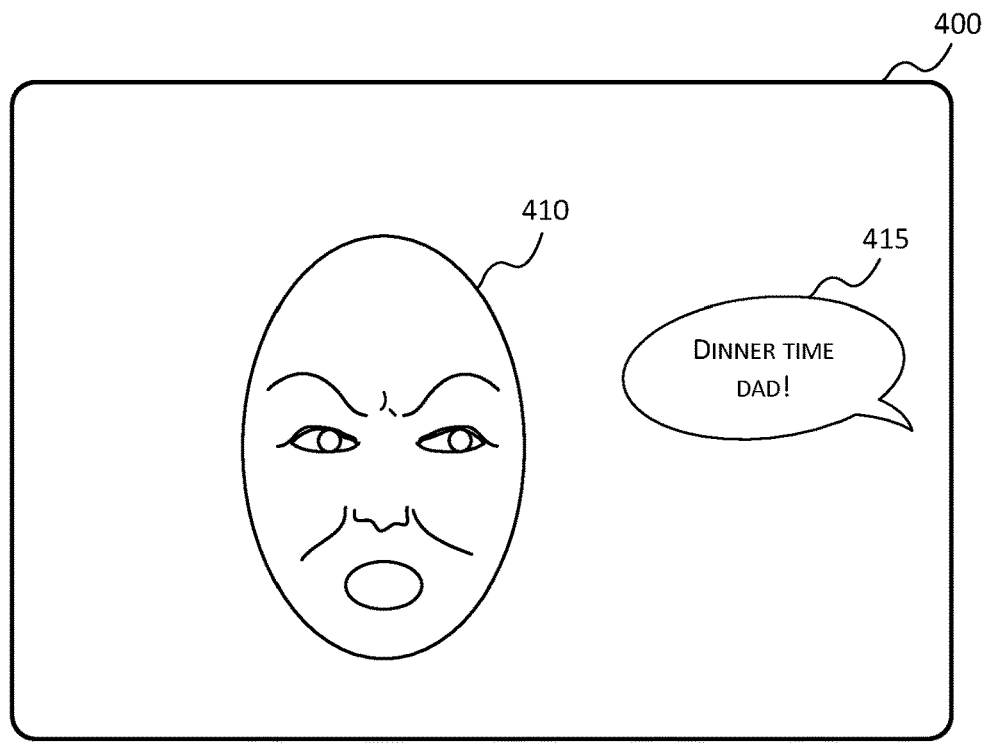
FIGS. 4A-4B show examples of sensor and content output associated with a primary viewer of content.
Figure 4B:
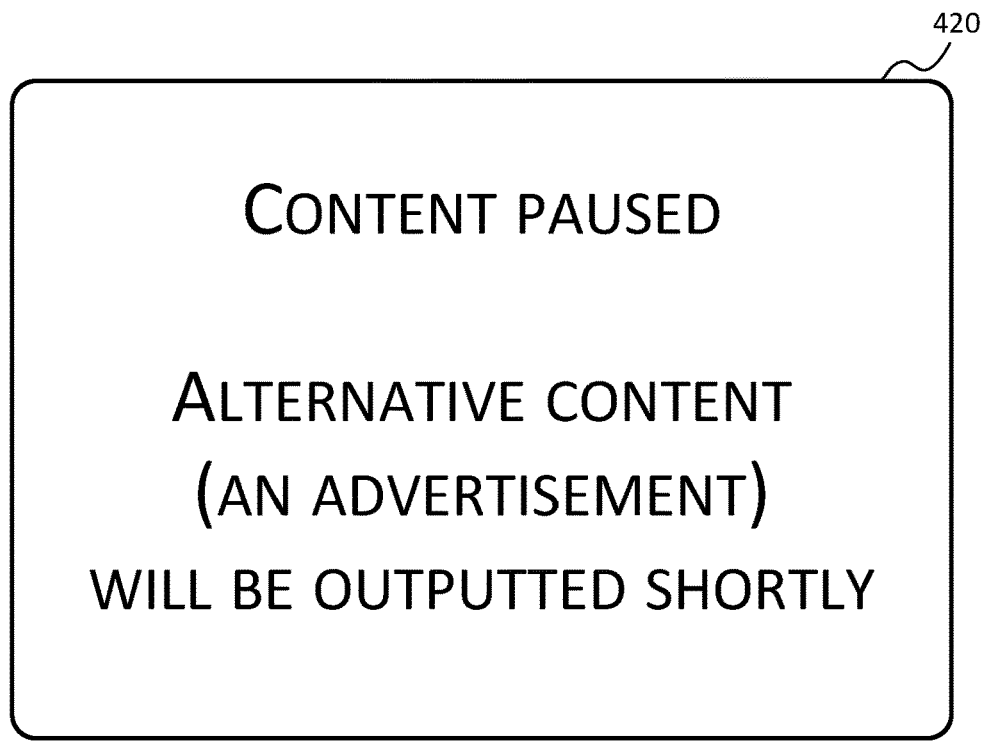

FIGS. 4A-4B show examples of sensor and content output associated with a primary viewer of content. Any of the computing devices shown in FIGS. 1-2 (e.g., the one or more mobile devices 125 and/or the reaction detection server 122) and/or any other computing device described herein may be used to implement any of the operations described herein.

In FIG. 4A, sensor output 400 comprises an image and sounds captured by sensors (e.g., a camera and microphone) of a computing device that is configured to capture images and detect sounds. In this example, the sensor output 400 comprises an image of a primary viewer 410 that is viewing content that contains violence that is unsuitable for younger viewers. The primary viewer 410 was looking at content and is glancing in the direction of the intrusion 415 which is the sound of the primary viewer 410's young child (e.g., a child of six years of age) announcing "DINNER TIME DAD!" to the primary viewer 410. The computing device associated with the sensor that captured the sensor output 400 may be configured to receive sensor data (e.g., the sensor data 310) from the sensor and provide the sensor data as an input to a machine learning model (e.g., the machine learning model 350) that is configured to detect facial expressions and/or words and determine whether a detected facial expression and/or words correspond to a reaction that satisfies one or more criteria that may trigger the modification (e.g., stoppage) of the output of content (e.g., a movie) that is being viewed by the primary viewer 410. In this example, the facial expression and gaze of the primary viewer 410 may correspond to a startled reaction to an intrusion which may satisfy the one or more criteria to pause output of content.

FIG. 4B shows an example of a computing device pausing the outputting of content based on the one or more criteria (e.g., a startled facial expression by a secondary viewer) being met. The indication 420 may comprise an image that was generated on a display screen of a user device (e.g., a tablet computing device) that was being viewed by the primary viewer 410. In response to the intrusion 415 and the primary viewer 410's reaction, the content that was being outputted to the primary viewer 410 was paused and the indication 420 which indicates that outputting of content has been paused and that alternative output (e.g., an advertisement) will be outputted shortly (e.g., within two seconds) was generated.

Figure 5:
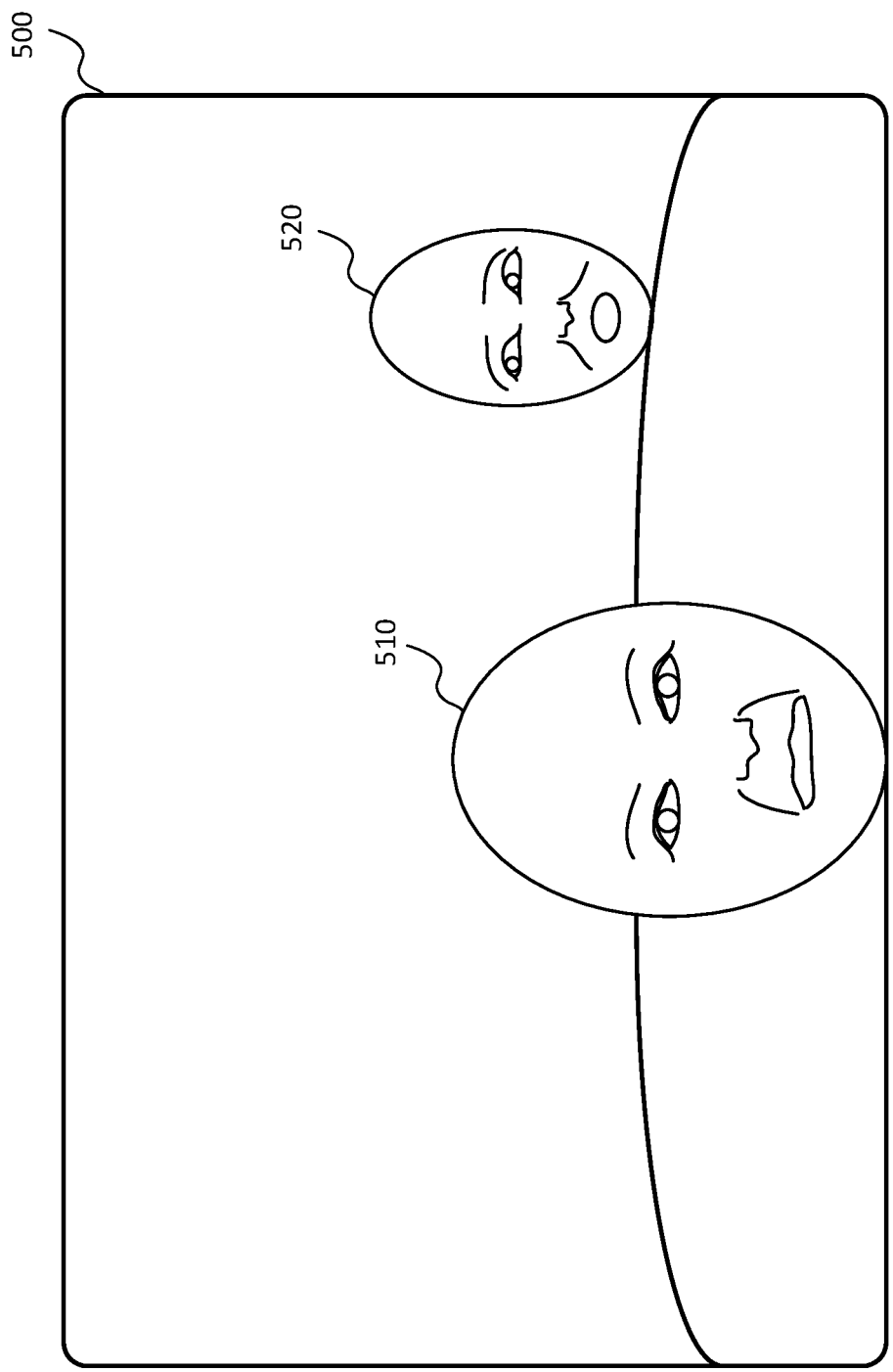
FIG. 5 shows an example of an image of a primary viewer and a secondary viewer that is captured by a sensor of a computing device that is configured to detect viewers and control the output of content based on viewer reactions.

FIG. 5 shows an example of an image of a primary viewer and a secondary viewer that is captured by a sensor of a computing device that is configured to detect viewers and control the output of content based on viewer reactions. Any of the computing devices shown in FIGS. 1-2 (e.g., the one or more mobile devices 125 and/or the reaction detection server 122) and/or any other computing device described herein may be used to implement any of the operations described herein.

In this example, the image 500 comprises a primary viewer 510 and a secondary viewer 520. The computing device associated with the sensor (e.g., a camera of a tablet computing device being used by the primary viewer 510 to view content) that captured the image 500 is configured to receive sensor data from the sensor and provide the sensor data as input to a machine learning model that is configured to detect and/or identify viewers of content. The machine learning model (e.g., the machine learning model 350) may be configured to determine which of the viewers is the primary viewer and which of the viewers is a secondary viewer. For example, the machine learning model may determine that a viewer is a primary viewer based on the viewer's proximity to the display output device that content is being outputted to, the viewer being the first viewer that is detected when output of content is initiated, and/or by comparing the primary viewer 510 to a database of stored images of primary viewers of content viewed on the computing device being used by the primary viewer 510. In this example, the machine learning model may have determined that the primary viewer 510 is the primary viewer and that a secondary viewer 520 is a secondary viewer.

Furthermore, the machine learning model may be configured to detect the direction of the gaze of a viewer. In this example, the machine learning model may be configured to determine whether the gaze of a secondary viewer 520 is directed to content that is also being viewed by a primary viewer. In this example, the machine learning model may have detected the gaze of the secondary viewer 520 and determined that the gaze of the secondary viewer 520 is directed to the same output device and content that the primary viewer 510 is viewing. Based on detecting the secondary viewer 520 looking at the same content as the primary viewer 510, the computing device in control of outputting the content may modify (e.g., pause) outputting of the content. Further, the machine learning model may have determined that the facial expression of the primary viewer 510 and/or the secondary viewer 520 is a surprised facial expression. Based on detecting a surprised facial expression by the primary viewer 510 and/or the secondary viewer 520, the computing device in control of outputting the content may modify (e.g., pause) outputting of the content.

Figure 6:
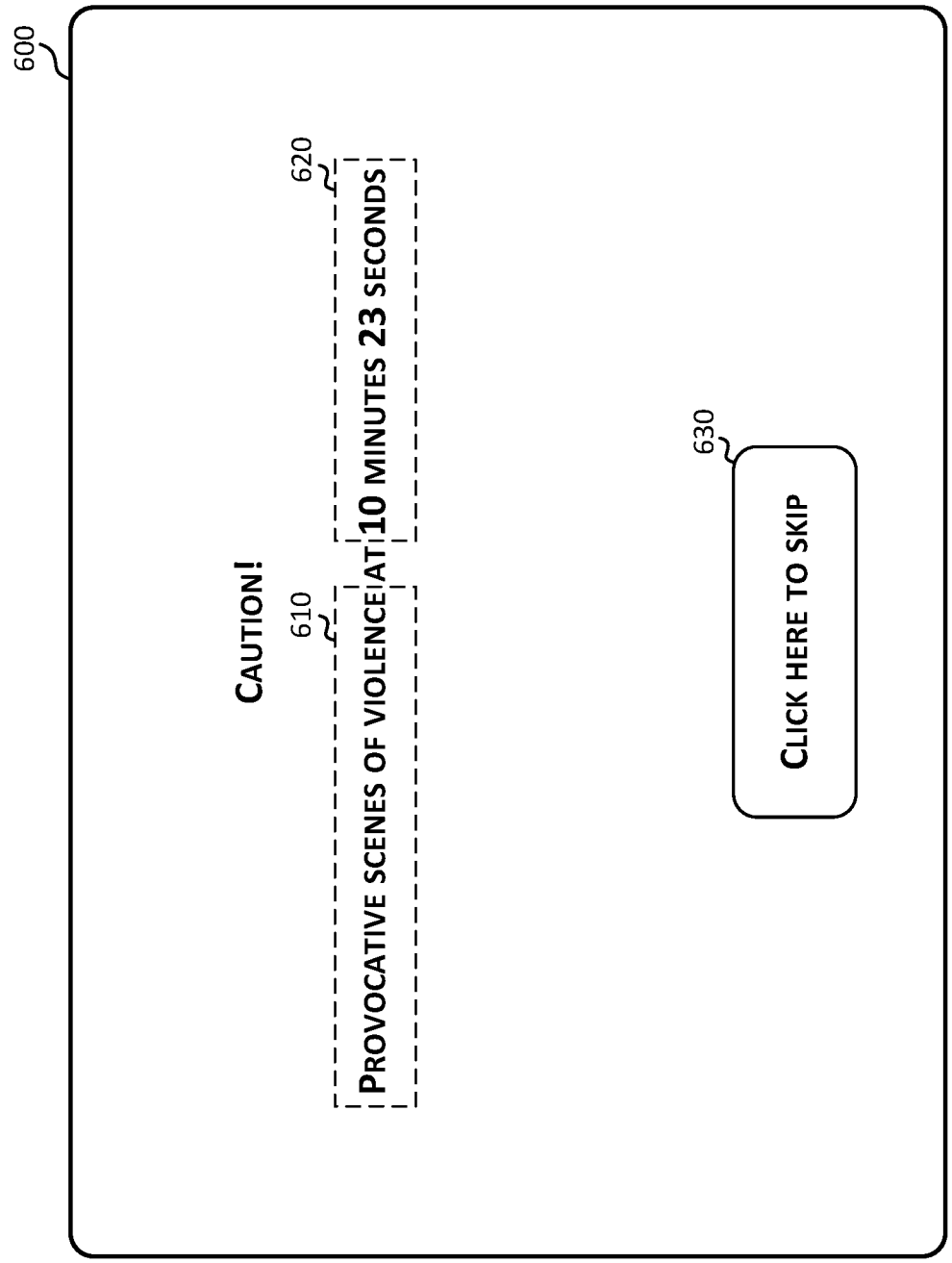
FIG. 6 shows an example of a user interface including an indication of restricted content and
a prompt to skip the restricted content.

FIG. 6 shows an example of a user interface including an indication of restricted content and a prompt to skip the restricted content. Any of the computing devices shown in FIGS. 1-2 (e.g., the one or more mobile devices 125 and/or the reaction detection server 122) and/or any other computing device described herein may be used to implement any of the operations described herein.

In this example, a computing device (e.g., a tablet computing device) may have detected a reaction of a secondary viewer (e.g., a child viewer that is eight years of age) in response to content (e.g., a slightly scary portion of a movie) that was being outputted by the computing device. The computing device may be under the control of a primary viewer (e.g., a parent of a secondary viewer) that is viewing the content at the same time as a secondary viewer. Further, the computing device may be configured to determine that a secondary viewer is a young child (e.g., a child below the age of thirteen years of age) and upon detecting the reaction of the primary viewer may determine that the reaction of the primary viewer satisfies one or more criteria (e.g., the primary viewer reacting in response to seeing a frightened expression on the face of the secondary viewer) that causes outputting of content on the computing device to be paused. Further, after pausing the outputting of the content, the computing device may output alternative content comprising an indication 610 of a category of content (e.g., "SCENES OF VIOLENCE") that will occur at a time 620 (e.g., "10 MINUTES 23 SECONDS"). Further, the computing device may generate an interface element 630 that may be used to skip the content associated with the indication 610. For example, the primary viewer may skip past the content comprising the scenes of violence by touching the interface element 630.

Figure 7A:
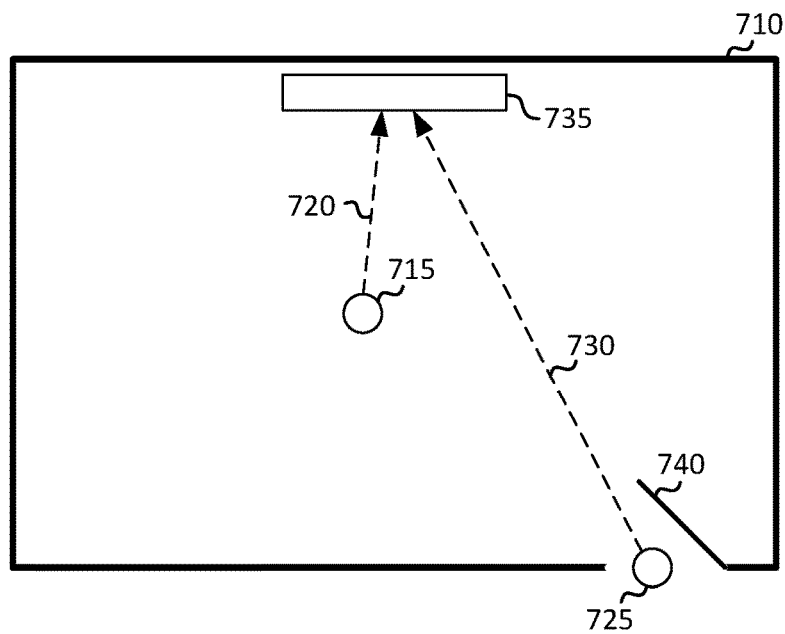
FIGS. 7A-7B show examples of an overhead view of a primary viewer and a secondary viewer during output of content to an output device.
Figure 7B:
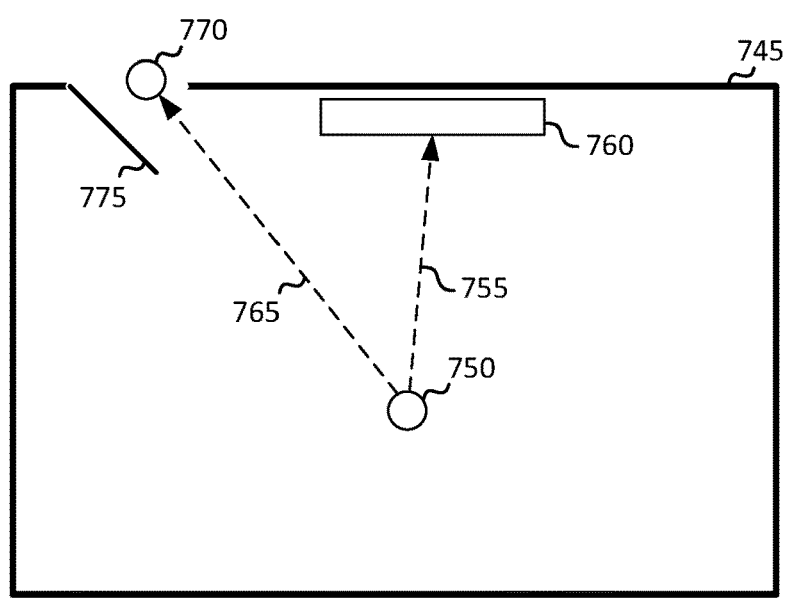

FIGS. 7A-7B show examples of an overhead view of a primary viewer and a secondary viewer during output of content to an output device. Any of the computing devices shown in FIGS. 1-2 (e.g., the one or more mobile devices 125 and/or the reaction detection server 122) and/or any other computing device described herein may be used to implement any of the operations described herein.

In FIG. 7A, a primary viewer 715 is viewing content that is being outputted via the device 735. The device 735 may comprise a computing device, an output device (e.g., a video monitor with loudspeakers), and at least one sensor (e.g., a camera and/or a microphone) that may be used to detect the state of the environment around the device 735. Further, the device 735 may implement a machine learning model (e.g., the machine learning model 350) that may be used to determine the state of the environment 710 including the reactions of viewers, the direction of a viewer's gaze, and/or intrusions (e.g., a door opening) within the environment 710. In this example, the device 735 has detected the primary viewer 715 and determined based on the proximity of the primary viewer 715 to the device 735 and the primary viewer 715 having initiated the output of content on the device 735, that the primary viewer 715 is the primary viewer. Further, the device 735 has determined that the primary viewer is viewing content that is being outputted via the device 735. The determination that the primary viewer 715 is viewing content on the device 735 may be based on the detection of the gaze of the primary viewer which is directed to the device 735 along the line of sight 720.

Furthermore, the device 735 may detect the secondary viewer 725. The device 760 may determine (e.g., using metadata embedded in the content) that the content (e.g., violent content) being outputted on the device 735 may not be suitable for viewing by the secondary viewer 725. Detection of the secondary viewer 725 may be based on the secondary viewer 725 opening the door 740 and the face of the secondary viewer being detected by the device 735. In this example, the device 735 may determine that the gaze of the secondary viewer 725 is directed to the device 735 along the line of sight 730. As a result, the device 735 may determine that the secondary viewer 725 is looking at the same content as the primary viewer 715 and may modify the content being outputted on the device 735 (e.g., skip past the violent content and/or output alternative content comprising a commercial).

In FIG. 7B, a primary viewer 750 is viewing content that is being outputted via the device 760. The device 760 may comprise a computing device, an output device (e.g., a video monitor with loudspeakers), and at least one sensor (e.g., a camera and/or a microphone) that may be used to detect the state of the environment around the device 760. Further, the device 735 may implement a machine learning model (e.g., the machine learning model 350) and perform operations similar to those of the machine learning model described with respect to FIG. 7A. In this example, the device 760 may have detected the primary viewer 750 and determined, based on the proximity of the primary viewer 750 to the device 760 and the primary viewer 750 having initiated the output of content on the device 760, that the primary viewer 750 is a primary viewer. Further, the device 760 may have determined that the primary viewer 750 is viewing content that is being outputted on the device 760. The determination that the primary viewer 750 is viewing content on the device 760 may be based on the detection of the gaze of the primary viewer which is directed to the device 760 along the line of sight 755.

Furthermore, the device 760 may detect that the primary viewer 750 has glanced along the line of sight 765 at the secondary viewer 770. Detection of the secondary viewer 770 may be based on the secondary viewer 770 opening the door 775 and the sound of the door being opened being detected by a microphone of the device 760. Further, the device 760 may detect the change in ambient light that results from the door 775 being opened. In this example, the device 760 may determine that the gaze of the primary viewer 750 is directed to the secondary viewer 770 and may modify the content being outputted on the device 760 (e.g., pause outputting of the content on the device 760 and/or output alternative content comprising a commercial).

Figure 8:
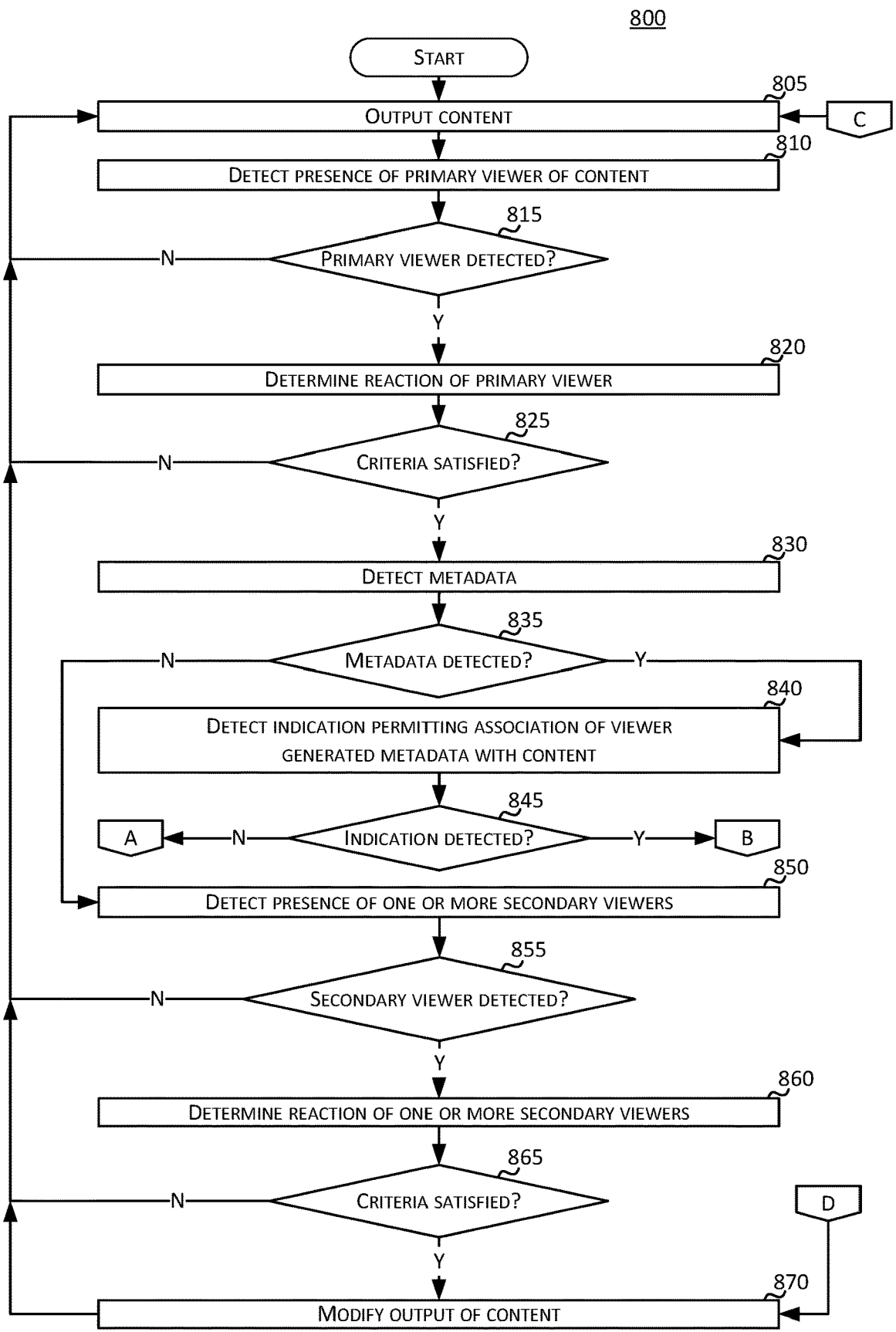
FIG. 8 is a flow chart showing steps for determining secondary viewer reactions to content.

FIG. 8 is a flow chart showing an example method for determining secondary viewer reactions to content. The steps of the method 800 may be used to modify the output of content based on a reaction of a secondary viewer to the outputted content. The steps of the method 800 may be performed by any device described herein, including the one or more mobile devices 125. Further, any of the steps of the method 800 may be performed as part of the method 900, and/or the method 1000. One, some, or all steps of the method 800 may be omitted, performed in other orders, and/or otherwise modified, and/or one or more additional steps may be added.

In step 805, content may be outputted. The content may comprise any combination of visual content and/or auditory content. For example, the content may comprise streaming video content that comprises a stream of images and/or sounds. Further, the content may be outputted via an output device (e.g., the display device 206 and/or any device that is capable of outputting content). For example, the output device may comprise any combination of a television, a smartphone, a tablet computing device, and/or a loudspeaker. Outputting of the content may comprise playing back the content to a viewer (e.g., a primary viewer and/or secondary viewer) that is within sight or hearing of the output device.

In step 810, during the outputting of the content, the presence of a primary viewer of the content may be detected. Detection of the presence of a primary viewer may be performed similarly to the detection of the presence of one or more secondary viewers described in step 850. Detection of the presence of a primary viewer may be based on the use of one or more sensors (e.g., a camera, microphone, and/or thermal sensor) that are configured to generate output that indicates the presence of a primary viewer. For example, a camera may capture the image of a primary viewer. The image of the primary viewer may be used to detect the presence of a primary viewer by inputting the image into a computing device associated with an output device that outputs the content. The computing system may process the image and determine whether the presence of a primary viewer was detected. By way of further example, a microphone may be configured to capture audio produced by a primary viewer. The audio of the primary viewer may be compared to one or more voice samples and/or audio voice prints in order to detect the presence of a primary viewer (e.g., a primary viewer may be detected if captured audio matches an audio voice print). Further, a thermal sensor may detect a primary viewer based on the captured thermal image matching a thermal signature associated with a primary viewer.

Detection of the presence of a primary viewer may be based on a primary viewer of the content providing identifying information prior to and/or during the outputting of the content. For example, a primary viewer of the content may provide identifying information comprising user credentials (e.g., a user name and password) to an output device that is used to output the content (e.g., a computing device that is associated with outputting the content). The presence of a primary viewer may be detected based on the provided identifying information being associated with a primary viewer.

Detection of the presence of a primary viewer may be based on a primary viewer being in possession of a device (e.g., the mobile device 125) that is associated with the primary viewer and is configured to send a signal indicating that a primary viewer is present to an output device that outputs the content. For example, a primary viewer of the content may have a smartphone that sends wireless signals to the output device that outputs the content. The wireless signals sent from the smartphone may comprise information associated with the primary viewer and may indicate the presence of the primary viewer to the output device that receives the wireless signals.

Detection of the presence of a primary viewer may be based on using a machine learning model (e.g., the machine learning model 350) and/or data received from one or more sensors (e.g., a camera, microphone, and/or thermal sensor). The machine learning model may use input (e.g., images of an environment including a primary viewer) from the sensor to detect a primary viewer. The machine learning model may then process the input and generate an output that indicates whether a primary viewer has been detected.

The sensor may comprise a camera. Further, the machine learning model may be configured to determine the presence of viewers within a field of view of the sensor. For example, a tablet computing device may include a camera positioned above the display output device of the tablet computing device. The camera may be positioned so that it may capture images of a viewer looking at content being outputted via the display output device as well as the environment surrounding the viewer. Based on comparing the image captured by the camera to previously detected images of viewers, the machine learning model may determine the identity of viewers (e.g., the identity of a primary viewer and/or secondary viewer). Based on the identity of the viewer of the content matching the identity of a previously detected primary viewer (e.g., a user that is designated as the primary user of the device being used to output the content), the machine learning model may determine that a primary viewer is present. Based on the identity of the viewer of content not matching the identity of a previously detected primary viewer the viewer may be determined to be a secondary viewer.

Furthermore, detection of the presence of a primary viewer of the content may comprise determining whether a primary viewer initiated the outputting of the content. For example, a primary viewer may be determined to be the first person that was detected when output of the content was initiated. Further, a primary viewer may be determined to be the person that was detected to have initiated output of the content and/or a viewer whose face matches the face of a primary viewer associated with the output device on which the content is being outputted.

In step 815, there may be a determination of whether a primary viewer was detected. Based on the presence of a primary viewer being detected, step 830 may be performed. For example, a computing device (e.g., the mobile device 125) may determine whether the output of one or more sensors (e.g., the one or more sensors described in step 810) and/or a machine learning model (e.g., the machine learning model described in step 810) indicates that a primary viewer was detected. Based on the output indicating that a primary viewer was detected a determination of a reaction of a primary viewer may be performed in step 830.

Based on the presence of a primary viewer not being detected, step 805 may be performed and a subsequent portion of content may be outputted. For example, a computing device (e.g., the mobile device 125) may determine whether the output of a sensor (e.g., the one or more sensors described in step 810) and/or a machine learning model (e.g., the machine learning model described in step 810) indicates that a primary viewer was not detected. Based on the output indicating that a primary viewer was not detected, a subsequent portion of content may be outputted in step 805.

In step 820, a reaction of a primary viewer of a portion of content being outputted may be determined. Determination of a reaction of a primary viewer may be performed similarly to the determination of a reaction of one or more secondary viewers described in step 860. A reaction of a primary viewer may comprise an action (e.g., a gesture, facial expression, change in gaze, and/or utterance) that is performed in response to an event (e.g., a portion of the content being outputted), the presence of another person (e.g., a secondary viewer), and/or the reaction of another person (e.g., a primary viewer). For example, a reaction of a primary viewer may comprise one or more actions by the primary viewer in response to the primary viewer detecting the presence of a secondary viewer. Further, the one or more actions by the primary viewer may for example comprise the primary viewer turning their head or looking in the direction of an output device that is outputting content, uttering a comment to a secondary viewer, gasping in response to content being outputted, making a startled expression, and/or pointing a finger in the direction of a secondary viewer.

Based on one primary viewer being detected, a reaction of the one primary viewer may be determined. Based on more than one primary viewer being detected, a reaction of each of the primary viewers may be determined individually. For example, based on two primary viewers being detected, reactions from both primary viewers may be determined. As the content is being outputted, one or more additional primary viewers may be detected and reactions of the one or more additional primary viewers that are detected may be determined. Further a reaction of each of the primary viewers that was detected may be individually evaluated against the one or more criteria described in step 825. The determined reaction of any of the primary viewers satisfying the one or more criteria may be determined to satisfy the one or more criteria described in step 825.

Determination of a reaction of a primary viewer may be based on the use of a machine learning model and/or data received from one or more sensors. For example, determining a reaction of the primary viewer may comprise using a machine learning model that is configured to determine a reaction of the primary viewer. The machine learning model used to determine a reaction of a primary viewer may different from a machine learning model that is used to detect the presence of a primary viewer of content. Further, the machine learning model used to determine a reaction of a primary viewer may be the same machine learning model that is used to detect the presence of a primary viewer of content.

Based on the data received from the one or more sensors, the machine learning model may be configured to generate output comprising an indication of a reaction of the primary viewer. For example, the machine learning model may be configured to output a score that corresponds to one or more reactions (e.g., looking at the content being outputted, having a surprised expression, and/or gasping loudly) by a primary viewer. The score may be lower (or zero) based on a reaction of a primary viewer being subtle and/or ambiguous and the score may be higher based on a reaction of a primary viewer being obvious and/or overt. Further, the score may increase or decrease based on the number of reactions of a primary viewer and/or the magnitude of a reaction by a primary viewer. For example, based on a primary viewer being determined to have fallen asleep during the outputting of the content, the score may be low (e.g., a score of one on a scale of one to one hundred). Based on a primary viewer being determined to suddenly look away from the content in the direction of a secondary viewer, the score may be high (e.g., a score of ninety on a scale of one to one hundred).

The one or more sensors may comprise an image sensor (e.g., a camera) that sends image data to a machine learning model that is configured and/or trained to detect facial expressions (e.g., facial expressions of a primary viewer of content) based on the image data. For example, the machine learning model may be trained using tagged still images and/or video recordings of the faces of viewers emoting various facial expressions as a reaction to seeing a secondary viewer or certain types of content (e.g., violent content). After being trained, the machine learning model may receive image data from a camera and analyze the image data to determine visual features including features that correspond to facial expressions (e.g., an open mouth or grimace).

The one or more sensors may comprise a microphone. Further, the machine learning model may be configured to determine the amplitude of an utterance (e.g., a gasp by a primary viewer) and/or recognize spoken words (e.g., the machine learning model may be configured to process natural language) based on audio data received from the microphone. For example, machine learning model may analyze audio data to determine whether certain words have been uttered (e.g., "OH NO!") or whether a loud gasp has been uttered by a primary viewer.

The one or more sensors may comprise a camera that is configured to capture images of the primary viewer. Further, satisfying the one or more criteria may comprise the heart rate of the primary viewer exceeding a heart rate threshold. The system may be configured to detect a primary viewer's heart rate based on capturing images of a primary viewer and analyzing changes in the skin color of a primary viewer. For example, analysis of RGB components of a video frames comprising images of a viewer (e.g., primary viewer or secondary viewer) may be used to determine changes in the RGB values that correspond to a heart-rate of the primary viewer. The timing with which the skin color around portions of a primary viewer's face (e.g., forehead, nose, mouth, and/or eyes) changes (e.g., a timing that corresponds to the pulsing of blood through the body) may correspond to the heart-rate of the primary viewer. The system may then determine whether the heart-rate of the primary viewer exceeds a threshold that may be determined based on a baseline heart-rate of the primary viewer. For example, based on a primary viewer having a baseline heart rate of fifty-five beats per minute, a heart rate threshold may be set to be twenty beats higher than the baseline heart rate (e.g., seventy-five beats per minute) which may correspond to the change in heart rate that occurs when a primary viewer is surprised by the sight of an unexpected second viewer or reacts strongly to content that is being outputted.

The machine learning model may be configured to determine (e.g., using data from one or more sensors comprising a camera) a reaction comprising a primary viewer looking at one or more secondary viewers. For example, the machine learning model may be configured to determine the position of a primary viewer and a position of a secondary viewer. The machine learning model may also be configured to determine the gaze direction of a primary viewer and whether the gaze direction of a primary viewer is directed to the position of a secondary viewer.

The machine learning model may be configured to determine (e.g., using data from one or more sensors comprising a camera and/or microphone) a reaction of a primary viewer to an intrusion. For example, the machine learning model may be configured to detect intrusions (e.g., the sound of approaching footsteps and/or the sound of a door opening). Based on an intrusion being detected, the machine learning model may determine whether a reaction of the primary viewer is a reaction in response to the intrusion (e.g., a startled facial expression or gesture when the sound of approaching footsteps is heard by a primary viewer).

In step 825, there may be a determination of whether one or more criteria (e.g., one or more criteria associated with a reaction of a primary viewer) have been satisfied. Based on the determined reaction (e.g., the reaction of a primary viewer determined in step 820) of a primary viewer satisfying one or more criteria, step 830 may be performed. For example, a computing device (e.g., the mobile device 125) may analyze the output (e.g., the score) from the machine learning model and determine that one or more criteria associated with determination of a reaction of a primary viewer have been satisfied. For example, the determined reaction of the primary viewer may satisfy the one or more criteria based on the output from the machine learning model indicating that a primary viewer has looked in the direction of a secondary viewer for greater than some predetermined amount of time (e.g., two seconds).

Further, satisfying the one or more criteria may comprise a determined reaction of the primary viewer corresponding to a surprised facial expression, an embarrassed facial expression, and/or a disgusted facial expression. For example, the machine learning model may detect a startled facial expression on the face of a primary viewer that caught sight of a secondary viewer. The startled facial expression may be compared to one or more types of facial expressions that satisfy the one or more criteria. Based on a startled facial expression matching one of the one or more types of facial expression that satisfies the one or more criteria, the one or more criteria may be determined to be satisfied.

The machine learning model may be configured to determine the amplitude of an utterance (e.g., an utterance by a primary viewer) and/or recognize spoken words (e.g., the machine learning model may be configured to process natural language and may determine a reaction based on recognition of one or more words spoken by the primary viewer). For example, the one or more criteria may be satisfied by the primary viewer saying a personal name (e.g., the name of a secondary viewer) or speaking to someone (e.g., asking a secondary viewer the question "WHAT ARE YOU DOING THERE?"). Further, the one or more criteria may be satisfied based on a determined reaction of the primary viewer comprising a primary viewer's utterance exceeding a threshold amplitude (e.g., a threshold amplitude in decibels) and/or a primary viewer uttering one or more key words. For example, the one or more criteria may be satisfied based on a reaction of a primary viewer comprising an utterance that is louder than a predetermined threshold (e.g., an utterance louder than sixty five decibels) and which may indicate a reaction to a secondary viewer.

Further, in step 825, based on the determined reaction of at least one of the one or more secondary viewers not satisfying one or more criteria, step 805 may be performed and a subsequent portion of content may be outputted. For example, a computing device (e.g., the mobile device 125) may analyze the output (e.g., a score) from the machine learning model and determine that one or more criteria associated with determination of a reaction of at least one primary viewer have not been met. For example, a reaction of a primary viewer may comprise the primary viewer briefly glancing at a secondary viewer before returning to viewing content that is being outputted.

In step 830, metadata associated with the portion of content being outputted may be detected. For example, a computing device (e.g., the mobile device 125) that outputs the content may analyze the portion of content being outputted and detect metadata (e.g., a transcript associated with the content being outputted) associated with the portion of content being outputted. The metadata may comprise information associated with the content being outputted. For example, the metadata may comprise one or more of a transcript corresponding to speech in the content, a description of non-speech portions of the content, and/or one or more indications of the time interval corresponding to the portion of content being outputted.

Furthermore, the content may be associated with metadata comprising indications of one or more portions of the content that are associated with one or more predefined types (e.g., provocative content and/or non-provocative content). The predefined types of content may provoke a reaction (e.g., scowling, grimacing, frowning, shutting the eyes, smirking) from a viewer (e.g., a primary viewer and/or one or more secondary viewers). Further, the metadata may comprise an indication of a time (e.g., a time relative to the starting time of the content) at which a portion of content associated with the one or more predefined types of content (e.g., violent content, nudity, and/or profanity) occurs. For example, the metadata may indicate that a portion of content (e.g., a scene of nudity) associated with the one or more predefined types of content occurs at a time of eleven minutes and five seconds from the starting time of the content.

In step 835, there may be a determination of whether metadata associated with the portion of content being outputted was detected. Based on metadata associated with the portion of content being outputted being detected, step 840 may be performed. For example, after a computing device (e.g., the mobile device 125) detects metadata associated with the portion of content being outputted, the computing device may detect whether there is an indication of permission to associate viewer generated metadata with content in step 840.

Based on metadata not being associated with the portion of content being outputted, step 850 may be performed. For example, after a computing device (e.g., the mobile device 125) detects no metadata associated with the portion of content being outputted, the computing device may detect the presence of one or more secondary viewers in step 850.

In step 840, based on metadata associated with the portion of content being outputted being detected, an indication of permission to associate viewer generated metadata with the content may be detected. For example, a computing device (e.g., the mobile device 125) that outputs the content may analyze the content to determine whether the content comprises an indication that viewer generated metadata may be associated with the content and/or added to existing metadata that is associated with the content. For example, the content may comprise a content flag that indicates "1" if viewer generated metadata is associated with the content or "0" if viewer generated metadata is not be associated with the content.

In step 845, there may be a determination of whether an indication of permission to associate viewer generated metadata with the content was detected. Based on the indication of permission to associate viewer generated metadata with the content being detected, step 905 may be performed by way of the "B" connector indicated in FIGS. 8 and 9. For example, after a computing device (e.g., the mobile device 125) detects a content flag that indicates that a viewer is permitted to associate viewer generated metadata with the content, an intrusion may be detected in step 905 by way of the "B" connector.

Figure 10:
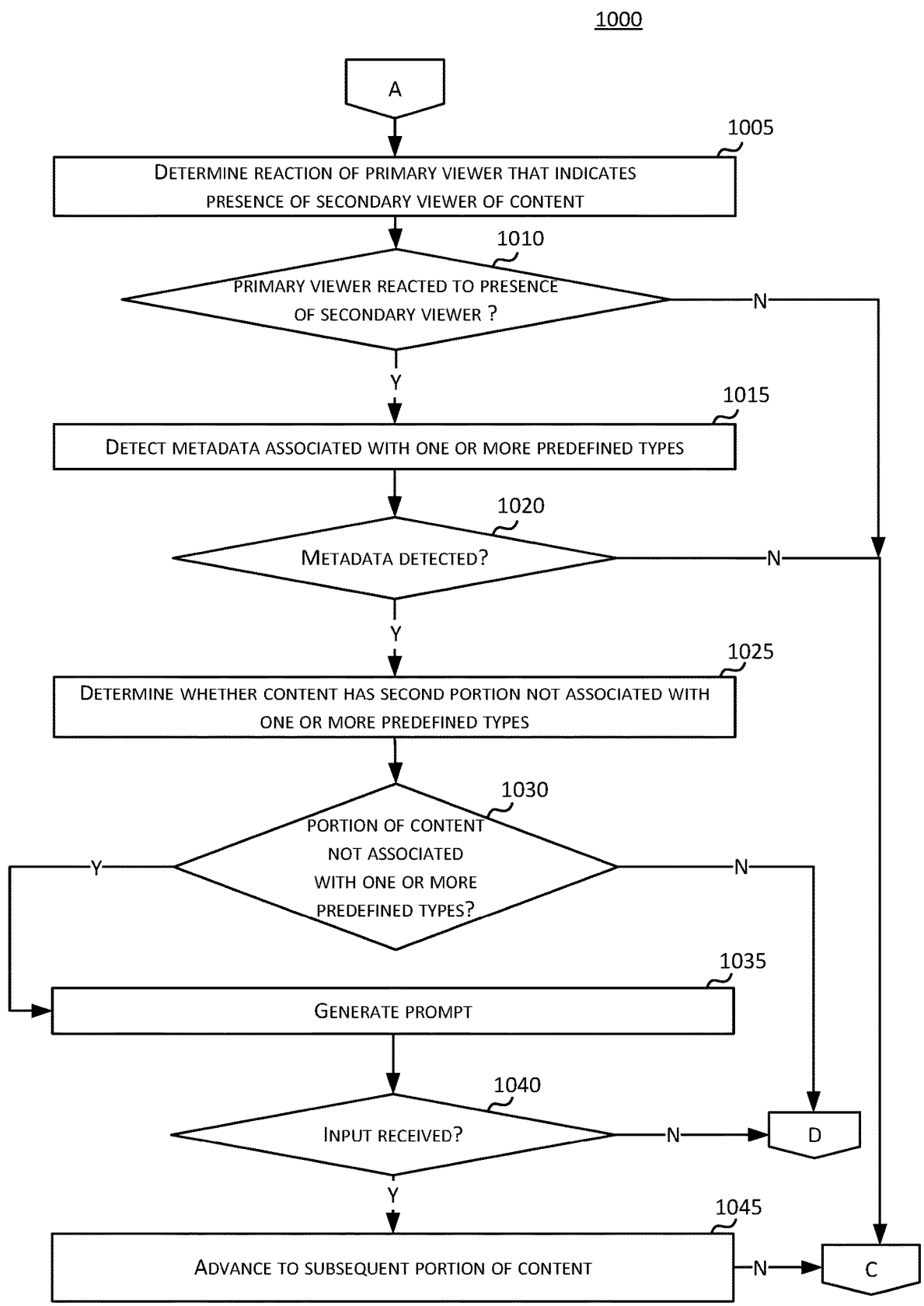
FIG. 10 is a flow chart showing steps for determining primary viewer reactions to metadata enriched content.

Based on the indication of permission to associate viewer generated metadata with the content not being detected, step 1005 may be performed by way of the "A" connector indicated in FIGS. 8 and 10. For example, after a computing device (e.g., the mobile device 125) detects a content flag that indicates that a viewer is not permitted to associate viewer generated metadata with the content, a reaction of a primary viewer that indicates the presence of a secondary viewer of content may be determined in step 1005 by way of the "A" connector.

In step 850, based on metadata associated with the portion of content not being outputted being detected, during the outputting of a portion of content, the presence of one or more secondary viewers of the content may be detected. Detection of the presence of the one or more secondary viewers may be performed similarly to the detection of the presence of a primary viewer described in step 810. For example, detection of the presence of one or more secondary viewers may be based on the use of one or more sensors (e.g., a camera, microphone, and/or thermal sensor) that are configured to generate output that indicates the presence of one or more secondary viewers.

Further, detection of the presence of one or more secondary viewers may be based on a secondary viewer being in possession of a device (e.g., the mobile device 125) that is associated with the secondary viewer and is configured to send a signal indicating that a secondary viewer is present to an output device that outputs the content. For example, a secondary viewer may be wearing a smartwatch that sends wireless signals to the output device that outputs the content. The wireless signals sent from the smartwatch may comprise information associated with the secondary viewer (e.g., information indicating that the secondary viewer is a child)

and may indicate the presence of the secondary viewer to the output device that receives the wireless signals.

The presence of one or more secondary viewers may be based on a determination that any viewer that is detected and is not a primary viewer (e.g., a primary viewer detected in step 810) is a secondary viewer. For example, if a primary viewer that initiated output of content was detected, the child of the primary viewer that is detected and not determined to be a primary viewer may be determined to be a secondary viewer.

Further, detection of one or more secondary viewers may be based on the use of a machine learning model (e.g., the machine learning model 350) and/or data from one or more sensors (e.g., a camera, microphone, and/or thermal sensor). Further, the machine learning model may be configured to determine that any viewer other than a primary viewer is a secondary viewer. For example, after detecting a primary viewer any other viewer detected during the outputting of a portion of content may be determined to be a secondary viewer.

In step 855, there may be a determination of whether the presence of one or more secondary viewers was detected. Based on the presence of one or more secondary viewers being detected, step 860 may be performed. For example, a computing device (e.g., the mobile device 125) may determine whether the output of a machine learning model (e.g., the machine learning model described in step 850) indicates that one or more secondary viewers were detected. Based on the output indicating that one or more secondary viewers were detected, a reaction of the one or more secondary viewers may be determined in step 860.

Based on the presence of one or more secondary viewers not being detected, step 805 may be performed and a subsequent portion of content may be outputted. For example, a computing device (e.g., the mobile device 125) may determine whether the output of a machine learning model (e.g., the machine learning model described in step 850) indicates that one or more secondary viewers were detected. Based on the output indicating that one or more secondary viewers were not detected, a subsequent portion of content may be outputted in step 805.

In step 860, a reaction of one or more secondary viewers of a portion of content being outputted may be determined. Determination of a reaction of one or more secondary viewers may be performed similarly to the determination of a reaction of a primary viewer described in step 820. The one or more secondary viewers may comprise one or more viewers that are different from the primary viewer. A reaction (e.g., a reaction of one or more secondary viewers) may comprise an action (e.g., a gesture, facial expression, change in gaze, utterance) that is performed in response to an event (e.g., a portion of the content being outputted) and/or the presence of another person (e.g., a reaction in response to the presence of a primary viewer and/or a reaction of a primary viewer). For example, a reaction of a secondary viewer may comprise turning their head or looking in the direction of an output device that is outputting content, gasping in response to content being outputted, making a startled expression, and/or raising their hands. Further, a reaction may comprise a combination of actions by a secondary viewer. For example, a facial expression of a secondary viewer may comprise grimacing and closing their eyes or a gesture may comprise raising their hands and turning their head away from the direction of an output device that is outputting content.

Based on one secondary viewer being detected, a reaction of the one secondary viewer may be determined. Based on more than one secondary viewer being detected, a reaction of each of the secondary viewers may be determined individually. For example, based on two secondary viewers being detected, reactions from both secondary viewers may be determined. As the content is being outputted, one or more additional secondary viewers may be detected and reactions of the one or more additional secondary viewers that are detected may be determined. Further a reaction of each of the secondary viewers that was detected may be individually evaluated against the one or more criteria described in step 865. The determined reaction of any of the secondary viewers satisfying the one or more criteria may be determined to satisfy the one or more criteria described in step 865.

Determination of a reaction of the one or more secondary viewers may be based on the use of a machine learning model and/or data received from one or more sensors. For example, determining a reaction of the one or more secondary viewers may comprise using a machine learning model that comprises a Bayesian hierarchical model and is configured to determine a reaction of the one or more secondary viewers. The machine learning model used to determine a reaction (e.g., a reaction of one or more secondary viewers) may be the same machine learning model that is used to detect the presence of a primary viewer of content. Based on the data received from the one or more sensors, the machine learning model may be configured to generate output comprising an indication of a reaction of the one or more secondary viewers. For example, the machine learning model may be configured to output a score that corresponds to one or more reactions (e.g., viewing the content, having a startled expression, and/or exclaiming loudly) by a secondary viewer. The score may be lower (or zero) based on a reaction of a secondary viewer being subtle and ambiguous and the score may increase based on the number of reactions and/or the magnitude of a reaction by a secondary viewer. For example, based on a secondary viewer being detected as passing the output device at a long distance and without glancing at the content, the score may be low (e.g., a score of five on a scale of one to one hundred). Based on a secondary viewer being detected as staring at the content with a shocked expression, the score may be high (e.g., a score of ninety on a scale of one to one hundred).

The one or more sensors may comprise a camera that sends image data to a machine learning model that is configured and/or trained to detect facial expressions (e.g., facial expressions of a primary viewer and/or secondary viewer of content) based on the image data. For example, the machine learning model may be trained using tagged still images and/or video recordings of the faces of viewers emoting various facial expressions. After being trained, the machine learning model may receive image data from a camera and analyze the image data to determine visual features including features that correspond to facial expressions (e.g., raised eyebrows or pursed lips).

The one or more sensors may comprise a microphone. Further, the machine learning model may be configured to determine the amplitude of an utterance (e.g., an utterance by a secondary viewer) and/or recognize spoken words (e.g., the machine learning model may be configured to process natural language) based on audio data received from the microphone. For example, machine learning model may analyze audio data to determine whether certain words have been uttered (e.g., "WOW") or whether a loud exclamation has been uttered by a viewer.

The one or more sensors may comprise a camera that is configured to capture images of the one or more secondary viewers. Further, satisfying the one or more criteria may comprise the heart rate of the one or more secondary viewers exceeding a heart rate threshold. The system may be configured to detect heart rate based on capturing images of a secondary viewer and analyzing changes in the skin color of a secondary viewer. For example, analysis of RGB components of a video frames comprising images of a viewer (e.g., primary viewer or secondary viewer) may be used to determine changes in the RGB values that correspond to a heart-rate of the viewer. The timing with which the skin color of around portions of a viewer's face (e.g., forehead, nose, and/or eyes) a secondary viewer changes (e.g., a timing that corresponds to the pulsing of blood through the body) may correspond to the heart-rate of the viewer. The system may then determine whether the heart-rate of the secondary viewer exceeds a threshold that may be determined based on a baseline heart-rate of the secondary viewer. For example, based on a secondary viewer having a baseline heart rate of sixty beats per minute, a heart rate threshold may be set to be twenty beats higher than the baseline heart rate (e.g., eighty beats per minute) which may correspond to the change in heart rate that occurs when a viewer is startled or otherwise reacts strongly to content that is being outputted.

The machine learning model may be configured to determine (e.g., using data from one or more sensors comprising a camera) a reaction comprising a secondary viewer looking at a primary viewer. For example, the machine learning model may be configured to determine the position of a primary viewer and a position of a secondary viewer. The machine learning model may also be configured to determine the gaze direction of a secondary viewer and whether the gaze direction of a secondary viewer is directed to the position of a primary viewer.

The machine learning model may be configured to determine (e.g., using data from one or more sensors comprising a camera and/or microphone) a reaction of one or more secondary viewers to an intrusion. For example, the machine learning model may be configured to detect intrusions (e.g., a door being opened and/or a light being turned on or off). Based on an intrusion being detected, the machine learning model may determine whether a reaction of the one or more secondary viewers is a reaction to the intrusion (e.g., looking in the direction of a door that was opened or closed, squinting when a light is turned on, and/or exclaiming when a dog runs past a secondary viewer).

In step 865, there may be a determination of whether one or more criteria (e.g., one or more criteria associated with a reaction of one or more secondary viewers) have been satisfied. Based on the determined reaction (e.g., the reaction of one or more secondary viewers determined in step 860) of one or more of the one or more secondary viewers satisfying one or more criteria, step 870 may be performed. For example, a computing device (e.g., the mobile device 125) may analyze the output (e.g., the score) from the machine learning model and determine that one or more criteria associated with determination of a reaction of at least one secondary viewer have been satisfied. For example, the determined reaction of the one or more secondary viewers may satisfy the one or more criteria based on the output from the machine learning model indicating that a secondary viewer has looked at the content for greater than some predetermined amount of time (e.g., five seconds).

Further, satisfying the one or more criteria may comprise a determined reaction of the one or more secondary viewers corresponding to a surprised facial expression, an embarrassed facial expression, and/or a disgusted facial expression. For example, the machine learning model may detect an embarrassed facial expression on the face of a secondary viewer that is surreptitiously viewing content that is being viewed by a primary viewer. The embarrassed facial expression may be compared to one or more types of facial expressions that satisfies the one or more criteria. Based on an embarrassed facial expression matching one of the one or more types of facial expression that satisfies the one or more criteria, the one or more criteria may be determined to be satisfied.

The machine learning model may be configured to determine the amplitude of an utterance (e.g., an utterance by a secondary viewer) and/or recognize spoken words (e.g., the machine learning model may be configured to process natural language and may determine a reaction based on recognition of one or more words spoken by the one or more secondary viewers). The one or more criteria may be satisfied based on a determined reaction of the one or more secondary viewers comprising a secondary viewer's utterance exceeding a threshold amplitude (e.g., a threshold amplitude in decibels) and/or a secondary viewer uttering one or more key words. For example, the one or more criteria may be satisfied based on a reaction of the one or more secondary viewers comprising a secondary viewer exclaiming "GOOD HEAVENS" or "GOODNESS GRACIOUS" loudly and/or repeatedly. An utterance such as "THAT'S INTERESTING" spoken in a soft voice may not be sufficient to satisfy the one or more criteria.

The machine learning model may be configured to determine a reaction (e.g., a facial expression, direction of a gaze, gesture, and/or utterance) by a secondary viewer based on data from one or more sensors. The determined reaction may comprise one or more of the one or more secondary viewers viewing the content. For example, the machine learning model may detect a gaze of a secondary viewer and determine that the gaze is being directed towards content that is being outputted on an output device that is being looked at by a primary viewer.

The machine learning model may be configured to determine a reaction comprising a secondary viewer looking at a primary viewer. The determined reaction may comprise one or more of the one or more secondary viewers looking at a primary viewer. For example, the machine learning model may detect a direction of a gaze of a secondary viewer and determine that the one or more criteria are satisfied when the gaze of the secondary viewer is directed towards a primary viewer for greater than a threshold amount of time (e.g., half a second).

The machine learning model may be configured to determine whether a reaction of the one or more secondary viewers comprises the one or more secondary viewers reacting to an intrusion. The machine learning model may detect an intrusion and the determined reaction may comprise a secondary viewer being determined to have reacted to the intrusion. For example, the one or more criteria may be satisfied based on detecting an intrusion comprising a door being opened and a reaction comprising a secondary viewer turning their head to look at the opened door after the door being opened was detected.

Further, in step 865, based on the determined reaction of at least one of the one or more secondary viewers not satisfying one or more criteria, step 805 may be performed and a subsequent portion of content may be outputted. For example, a computing device (e.g., the mobile device 125) may analyze the output (e.g., the score) from the machine learning model and determine that one or more criteria associated with determination of a reaction of at least one secondary viewer have not been met. For example, a reaction of the one or more secondary viewers may comprise one or more secondary viewers walking past the content being outputted without looking at the content.

In step 870, based on a determined reaction (e.g., the determined reaction of a primary viewer described in step 820 and/or the determined reaction of one or more secondary viewers described in step 860) satisfying one or more criteria, outputting of the content may be modified. For example, a computing device may perform one or more actions comprising stopping the outputting of video and/or audio of the content. The content may comprise audio and modifying the outputting of the content may comprise reducing a volume of the audio in the content. For example, the volume of audio in content may be muted or reduced to a predetermined level of volume.

Modifying the outputting of the content may comprise outputting alternative content that is different from the content may be outputted. For example, a still image (e.g., the indication 420 in FIG. 4 which indicates that content has been paused) or alternative video content (e.g., a screen saver including a nature scene or other default video images) may be outputted. Further, the alternative content may comprise an advertisement. For example, after content has been paused, one or more advertisements may be outputted.

Modifying the content may comprise determining, using a machine learning model configured to determine age based on one or more of audio of the one or more secondary viewers and/or video of one or more secondary viewers, an estimated age of the one or more secondary viewers. Modifying the content may comprise determining, using a machine learning model configured to determine age based on one or more of audio of a primary viewer and/or video of a primary viewer, an estimated age of the primary viewer. The alternative content may comprise an advertisement and determining the advertisement may be based on the estimated age that was determined. For example, the machine learning model may be configured and/or trained to estimate the age of viewers including a primary viewer and/or one or more secondary viewers. Further, outputting the alternative content may comprise determining the alternative content based on the lowest estimated age of the primary viewer and/or one or more secondary viewers. For example, based on the machine learning model determining that the lowest estimated age of the one or more secondary viewers is ten years of age, the system may output alternative content that is suitable for younger viewers in the eight to ten year old age range (e.g., an animated feature film without violence, profanity, or nudity).

A first portion of the content associated with one or more predefined types of content may be determined. For example, the content may be received as input. Video and/or audio from the content may be extracted by a machine learning model and analyzed using spoken language recognition techniques, audio recognition techniques, and/or visual feature recognition techniques to determine whether the content comprises one or more predefined types of content (e.g., provocative content). For example, a machine learning model may be configured to determine spoken profanity, smoking cigarettes, drinking alcoholic beverages, the sound of a firearm being discharged, and/or scenes of nudity within the content. Based on the analysis of the content, the machine learning model may generate one or more indications of one or more portions of the content that correspond to the one or more predefined types.

Further, modifying the outputting of the content may comprise, outputting, instead of the first portion of content, a second portion of content that does not correspond to one or more of the one or more predefined types of content. For example, a portion of the content that is associated with one of the one or more predefined types (e.g., a provocative portion of content that includes the use of profanity and/or violence) that is being outputted may be skipped and a second portion (e.g., the subsequent portion of content that is not provocative and does not include the use of profanity and/or violence) may be automatically outputted. After modifying the outputting of the output in step 870, the step 805 may be performed and a subsequent portion of content may be outputted.

Figure 9:
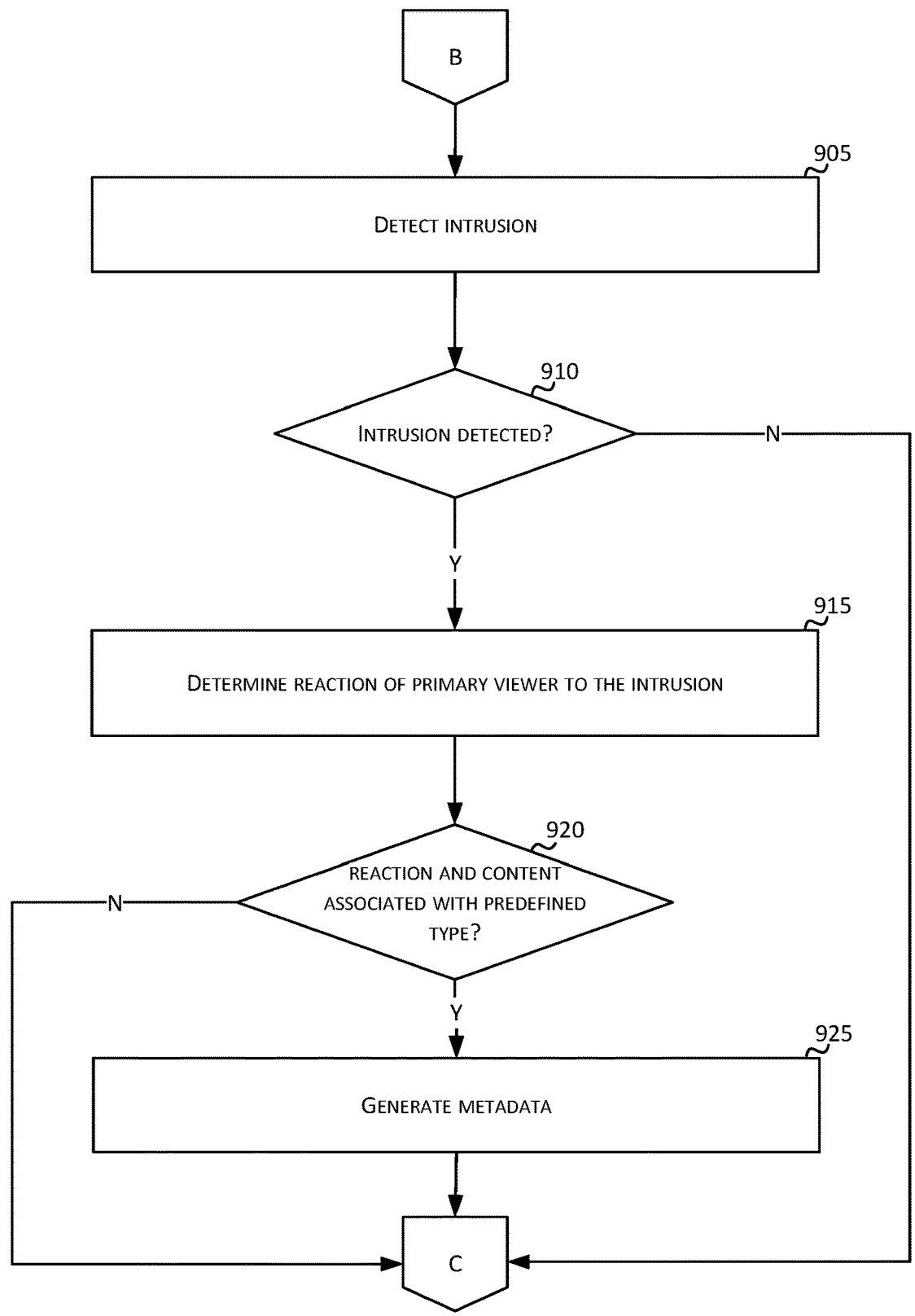
FIG. 9 is a flow chart showing steps for determining primary viewer reactions to content and generating metadata associated with predefined types.

FIG. 9 is a flow chart showing steps for determining primary viewer reactions to content and generating metadata associated with predefined types of content. As indicated by the "B" connectors in FIGS. 8 and 9, the steps of FIG. 9 may be performed based on performing steps 835, 840, and 45 (FIG. 8), and the steps of FIG. 9 may be part of the method 800. The steps of FIG. 9 may be used to generate metadata based on a reaction of a primary viewer to an intrusion during viewing of outputted content. The steps of FIG. 9 may be performed by any device described herein, including one or more mobile devices 125. The steps of FIG. 9 may be performed after content has started to be outputted to an output device and a primary viewer of the content has been detected. One, some, or all steps of FIG. 9 may be omitted, performed in other orders, and/or otherwise modified, and/or one or more additional steps may be added.

In step 905, during the outputting of content to a primary viewer (e.g., via an output device comprising a display output device), an intrusion into an environment associated with a primary viewer of the content may be detected. For example, as a computing device (e.g., the mobile device 125) outputs a video stream to a primary viewer, another person (e.g., a secondary viewer) may intrude on the environment by approaching a primary viewer. Further, the intrusion may comprise one or more of another person (e.g., one or more secondary viewers) coming within a predefined distance (e.g., within three meters) of a primary viewer, a door opening, a light being turned on, and/or a light being turned off.

Detection of the intrusion may be based on the use of a machine learning model that receives first data from one or more sensors. For example, the machine learning model may be configured to receive input from sensors comprising a camera and/or microphone. Further, the machine learning model may be configured and/or trained to detect changes in the state of an environment surrounding a primary viewer. Based on performance of operations on the input, the machine learning model may generate output indicating whether an intrusion not comprising a primary viewer has been detected. For example, the machine learning model may detect that the lights in a darkened room have been turned on and/or that another person is approaching a primary viewer.

The content may be associated with metadata comprising a transcription of the content. For example, the metadata may comprise a transcription in which each line of speech in the transcription is associated with a corresponding time interval. Further, the metadata may comprise a description of non-speech portions of the content. For example, the metadata may comprise descriptions of a setting (e.g., a description of the physical environment shown in content), descriptions of the appearance of characters shown in content, and/or descriptions of sounds or music being outputted in the content. The metadata may be used to determine portions of the content that may be associated with one or more predefined types (e.g., provocative portions of the content including violence, cigarette smoking, alcoholic beverages, nudity, and/or profanity that may provoke an adverse reaction in a viewer of the content).

In step 910, there may be a determination of whether an intrusion was detected. Based on an intrusion being detected, step 915 may be performed. For example, a computing device (e.g., the mobile device 125) may determine whether the output of a machine learning model (e.g., the machine learning model described in step 905) indicates that an intrusion was detected. Based on the output indicating that an intrusion was detected, a reaction of a primary viewer in response to the intrusion may be determined in step 915.

Further, based on an intrusion not being detected, step 805 may be performed by way of the "C" connector shown in FIGS. 8 and 9. For example, a computing device (e.g., the mobile device 125) may determine whether the output of a machine learning model (e.g., the machine learning model described in step 905) indicates that an intrusion was detected. Based on the output indicating that no intrusion was detected, a subsequent portion of content may be outputted in step 805 by way of the "C" connector shown in FIGS. 8 and 9.

In step 915, based on the machine learning model receiving second data from one or more sensors, a reaction of a primary viewer to the intrusion may be determined. The determination of a reaction of a primary viewer to the intrusion may be performed similarly to the determination of a reaction of a primary viewer in step 820, the determination of a reaction of the one or more secondary viewers in step 860, and/or the determination of a reaction of a primary viewer in step 1005. For example, the machine learning model may be configured to receive input from sensors comprising a camera and microphone. The machine learning model may be configured and/or trained to determine facial expressions, bodily gestures, and/or utterances of viewers comprising a primary viewer. Based on performance of operations on the input, the machine learning model may generate output indicating whether a primary viewer of content is reacting to an intrusion. For example, the machine learning model may detect that a primary viewer of content is looking over their shoulder as a reaction to a door being opened behind a primary viewer.

Based on a single primary viewer being detected, a reaction of the single primary viewer may be determined. Based on more than one primary viewer being detected, a reaction of each of the primary viewers may be determined individually. Further a reaction of each of the primary viewers that was detected may be individually evaluated to determine whether a reaction of a primary viewer is an adverse reaction as described in step 920. A reaction of any one of the primary viewers being determined to be an adverse reaction may be determined to indicate that a primary viewer's reaction is an adverse reaction.

In step 920, there may be a determination of whether a reaction of a primary viewer was determined and/or whether metadata comprising one or more key words associated with the one or more predefined types of content are indicated at a time associated with a reaction by a primary viewer was determined. The determination of a reaction of a primary viewer may be performed similarly to the determination of a reaction of one or more secondary viewers described in step 860 or the determination of a reaction of a primary viewer described in step 1005. A reaction (e.g., an adverse reaction) by a primary viewer may comprise facial expressions, gestures, and/or utterances by a primary viewer that indicate a negative response to the portion of content being outputted. For example, a reaction may comprise a primary viewer frowning when a portion of content associated with metadata comprising one or more key words (e.g., "KNIFE" or "SCREAM") is detected.

Based on a reaction of a primary viewer being an adverse reaction and the metadata comprising one or more key words associated with the one or more predefined types, step 925 may be performed. For example, a computing device may analyze the output from the machine learning model and determine that a reaction (e.g., an adverse reaction comprising a startled expression) by a primary viewer and a key word comprising a profanity have been detected. The computing device may then generate metadata indicating that the portion of content being outputted may be associated with one or more predefined types and a time associated with a reaction that was determined in step 925.

Based on a determined reaction of a primary viewer not being an adverse reaction and/or the metadata not comprising one or more key words associated with the one or more predefined types, step 805 may be performed by way of the "C" connector shown in FIGS. 8 and 9. For example, a computing device may analyze the output from the machine learning model and determine that neither an adverse reaction by a primary viewer nor a key word associated with the one or more predefined types have been detected and that the one or more criteria associated have not been met. The computing device may then output a subsequent portion of content in step 805 by way of the "C" connector.

In step 925, based on determining that a reaction of a primary viewer is an adverse reaction and that the metadata (e.g., the transcription) comprises one or more key words associated with the one or more predefined types, metadata may be generated. The metadata may comprise an indication that the content may be associated with the one or more predefined types and a time interval at which a reaction (e.g., the adverse reaction) was detected. For example, a computing device (e.g., the mobile device 125) may analyze the transcription to determine whether a key word associated with one or more predefined types (e.g., the key words "GUN" or "BLOOD") was indicated at the time of an adverse reaction by a primary viewer. The computing device may then generate metadata indicating the time interval (e.g., forty-seven minutes and ten seconds from the beginning of the content) at which a reaction (e.g., an adverse reaction) was determined.

After generating metadata in step 925, a subsequent portion of content may be outputted in step 850 by way of the "C" connector indicated in FIGS. 8 and 9.

FIG. 10 is a flow chart showing steps for determining primary viewer reactions to metadata enriched content. As indicated by the "A" connectors in FIGS. 8 and 10, the steps of FIG. 10 may be performed based on performing steps 835, 840, and 845 (FIG. 8), and the steps of FIG. 10 may be part of the method 800. The steps of FIG. 10 may be used to modify the outputting of content based on a reaction of a primary viewer to an intrusion during viewing of metadata enriched content. The steps of FIG. 10 may be performed by any device described herein, including one or more mobile devices 125. The steps of FIG. 10 may be performed after content has started to be outputted to via output device and a primary viewer of the content has been detected. One, some, or all steps of FIG. 10 may be omitted, performed in other orders, and/or otherwise modified, and/or one or more additional steps may be added.

In step 1005, a reaction of a primary viewer of the content that indicates the presence of one or more secondary viewers of the content may be determined. For example, a primary viewer (e.g., an adult) of content (e.g., a documentary movie about the second world war) may react to seeing a secondary viewer (e.g., a small child) watching the content by making a startled facial expression and/or addressing a secondary viewer. Determination of a reaction of a primary viewer may be based on the use of a machine learning model that receives data from one or more sensors. Further, determination of a reaction of a primary viewer may be performed similarly to the determination of a reaction of a primary viewer described in step 915 and/or the determination of a reaction of one or more secondary viewers described in step 860. For example, the machine learning model may be configured to receive data from one or more sensors comprising a camera and microphone. Further, the machine learning model may be configured and/or trained to determine facial expressions, bodily gestures, and/or utterances of viewers comprising a primary viewer. Based on performance of operations on the input, the machine learning model may generate output indicating whether a primary viewer of content is reacting to the presence of a secondary viewer of content. For example, the machine learning model may determine that a primary viewer of content is looking away from the content and reacting by gesturing towards a secondary viewer.

The one or more sensors may comprise a heart-rate sensor (e.g., a wearable heart-rate sensor worn by a primary viewer) that is configured to detect a heart-rate of the primary viewer. Further, a reaction of a primary viewer that indicates the presence of one or more secondary viewers is based on fluctuations of the heart-rate of a primary viewer (e.g., the fluctuations of the primary viewer matching one or more heart rhythms that correspond to a reaction of a primary viewer that indicates the presence of one or more secondary viewers). For example, during outputting of the content, a secondary viewer may enter the room in which a primary viewer is viewing content. As a result of the entrance of a secondary viewer into the room, the heart-rate of a primary viewer may fluctuate in a way that is determined to match a heart rhythm that corresponds to a reaction of a primary viewer that indicates the presence of one or more secondary viewers.

The one or more sensors may comprise a camera and the machine learning model may be configured to use data from the camera to determine a reaction comprising a change in a gaze direction of a primary viewer. Further, a reaction of a primary viewer that indicates the presence of one or more secondary viewers may comprise a primary viewer gazing away from the content being outputted for greater than a threshold amount of time. For example, during outputting of the content, a secondary viewer may enter the room in which a primary viewer is viewing content. As a result of the entrance of a secondary viewer into the room, a primary viewer may change their gaze direction from the direction of the content being outputted to the direction of a secondary viewer. The change in the gaze direction of a primary viewer may be determined to be a reaction of a primary viewer that indicates the presence of one or more secondary viewers.

Furthermore, as described in step 830, metadata may be associated with the content. The metadata may comprise indications of one or more first portions of the content that are associated with one or more predefined types (e.g., provocative types of content). For example, the metadata may comprise an indication of a time at which content that is associated with one or more predefined types of content (e.g., provocative content comprising violent content or nudity) occurs.

In step 1010, there may be a determination of whether a determined reaction of a primary viewer indicates the presence of one or more secondary viewers. Based on the determined reaction of a primary viewer indicating the presence of one or more secondary viewers satisfying one or more criteria, step 1015 may be performed. For example, based on a primary viewer glancing at and addressed a secondary viewer during the outputting of a portion of content that was associated with metadata indicating a portion of content associated with the one or more predefined types, step 1015 may be performed.

Based on the determined reaction of a primary viewer not indicating the presence of one or more secondary viewers, a subsequent portion of content may be outputted in step 805 by way of the "C" connector indicated in FIGS. 8 and 10. For example, based on a primary viewer briefly (e.g., for less than half a second) looking away from the content being outputted then continuing to view the content, a primary viewer may be determined to not have had a reaction that indicates the presence of one or more secondary viewers.

In step 1015, there may be a determination of whether the determined reaction of a primary viewer occurs at a time associated with output of the one or more first portions of content (e.g., the one or more first portions of content associated with one or more predefined types of content). As described in step 830, the metadata may be associated with indications of one or more first portions of content that may be associated with one or more predefined types of content (e.g., provocative content). The one or more predefined types of content may comprise content that is indicated as being provocative and may include violence, nudity, consumption of alcoholic beverages, cigarette smoking, sexual intimacy, narcotics use, physical abuse, pestilence, disease, starvation, warfare, psychological abuse, politically sensitive discourse, hate speech, criminal activity, and/or profanity. A portion of content that is not indicated as being associated with the one or more predefined types may be determined to be non-provocative (e.g., content that does not include violence, nudity, and/or profanity). Further, the metadata may indicate time intervals associated with the one or more predefined types of content (e.g., the times at which provocative content and/or non-provocative content occur within content). For example, the metadata may indicate that a time interval from five minutes and eight seconds to ten minutes and twelve seconds comprises content that is associated with the one or more predefined types of content.

In step 1020, based on a determination that the determined reaction of a primary viewer occurs at a time associated with the one or more first portions of content associated with one or more predefined types of content, step 1025 may be performed. For example, based on a primary viewer's reaction being determined to have occurred within one second of a portion of content being outputted and the portion of content being associated metadata with that indicates one or more portions of content that are associated with the one or more predefined types of content, then step 1025 may be performed. Based on the determination that a reaction of a primary viewer does not occur at a time associated with the one or more first portions of content associated with one or more predefined types of content, step 805 may be performed by way of the "C" connector indicated in FIGS. 8 and 10.

In step 1025, one or more portions of the content that are not associated with the one or more predefined types of content may be detected. For example, a computing device may analyze the metadata to determine whether the metadata indicates that the content has a portion that is associated with the one or more predefined types. Based on the metadata indicating that the content comprises a portion associated with the one or more predefined types, step 1030 may be performed.

In step 1030, there may be a determination of whether the metadata indicates a portion of content that is not associated with the one or more predefined types. Based on the metadata indicating that there is a portion of the content that is not associated with the one or more predefined types, step 1035 may be performed. For example, after a computing device (e.g., the mobile device 125) detects metadata indicating a portion of the content that is not associated with the one or more predefined types (e.g., a non-provocative portion of the content is detected) the computing device may generate a prompt in step 1035.

Based on the metadata indicating that there is not a portion of the content that is not associated with the one or more predefined types, step 870 may be performed by way of the "D" connector shown in FIGS. 8 and 10. For example, after a computing device (e.g., the mobile device 125) detects metadata indicating that there is not a portion of the content that is not associated with the one or more predefined types (e.g., no non-provocative portion of the content is detected), the computing device may modify the content being outputted in step 870 by way of the "D" connector.

In step 1035, a prompt requesting an input to advance to a second portion of content (e.g., a portion of content that is not associated with the one or more predefined types and is non-provocative) may be generated. The prompt may indicate that the content being outputted may be modified automatically if an input is not received before a predetermined amount of time (e.g., twenty seconds) elapses. For example, a prompt may be generated on an output device (e.g., a video monitor) on which content was being outputted and viewed by a primary viewer. The prompt may comprise a request for an input to skip to a non-provocative portion of the content. For example, a prompt indicating "TAP THE SCREEN TO SKIP THE PROVOCATIVE CONTENT" may be generated on a display of a computing device (e.g., the mobile device 125) that is configured with a touch sensitive display that may be used to detect the input.

In step 1040, there is a determination of whether an input to advance to second portion of the content (e.g., a non-provocative portion of the content) was detected (e.g., detected within twenty seconds). Based on an input being detected, step 1045 may be performed. For example, after a computing device (e.g., the mobile device 125) detects an input (e.g., a touch on a touch sensitive display device) in response to the prompt generated in step 1035, step 1045 may be performed.

Based on an input not being detected (e.g., not being detected within ten seconds), step 870 may be performed by way of the "D" connector shown in FIGS. 8 and 10. For example, after a computing device (e.g., the mobile device 125) does not detect an input in response to the prompt generated in step 1035, step 870 may be performed by way of the "D" connector.

In step 1045, a subsequent portion of the content that is not associated with the metadata that indicates one or more portions of content that are associated with the one or more predefined types may be advanced to. For example, a computing device may skip from the portion of content that was being outputted to a subsequent portion of the content that is not associated with metadata that indicates one or more portions of content that are associated with the one or more predefined types. By way of further example, the computing device may skip past a violent portion of content to a portion of the content that does not contain violence or other provocative content.

After advancing to a portion of the content that is associated with metadata that is not associated with the one or more predefined types, a subsequent portion of the content may be outputted in step 805 by way of the "C" connector indicated in FIGS. 8 and 10.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
outputting, by a computing device, content;
detecting, during the outputting of the content, based on data received from one or more sensors, a presence of a primary viewer of the content being outputted;
determining a reaction of the primary viewer to one or more secondary viewers, wherein the secondary viewers were not present during the detecting the presence of the primary viewer;
determining, during the outputting of the content, using a machine learning model, and based on the reaction of the primary viewer, a reaction of the one or more secondary viewers, different from the primary viewer, to a portion of the content being outputted; and
modifying, based on the determined reaction of the one or more secondary viewers satisfying one or more criteria, the outputting of the content.

2. The method of claim 1, wherein the detecting the presence of the primary viewer comprises detecting the presence of the primary viewer using the machine learning model.

3. The method of claim 1, wherein the modifying the outputting of the content comprises one or more of:
stopping the outputting of audio of the content;
reducing a volume of audio of the content;
stopping the outputting of video of the content; or
outputting alternative content that is different from the content.

4. The method of claim 1, wherein the determined reaction of the one or more secondary viewers comprises one or more of:
the one or more secondary viewers viewing the content,
the one or more secondary viewers looking at the primary viewer, or
one or more of a surprised facial expression, an embarrassed facial expression, or a disgusted facial expression.

5. The method of claim 1, further comprising:
determining a first portion of the content associated with one or more predefined types of content, and wherein the modifying the outputting of the content comprises:
outputting, instead of the first portion, a second portion of the content.

6. The method of claim 1, wherein the content is associated with metadata that indicates one or more portions of content that are associated with one or more predefined types of content, and the determined reaction of the one or more secondary viewers comprises a reaction at a time that a portion of content, associated with the metadata, is being outputted.

7. The method of claim 1, wherein the machine learning model comprises a Bayesian hierarchical model and is configured to determine the reaction of the one or more secondary viewers.

8. The method of claim 1, wherein the machine learning model is configured to determine a reaction based on an amplitude of an utterance of the one or more secondary viewers.

9. The method of claim 1, wherein the machine learning model is configured to determine a reaction based on recognition of words spoken by the one or more secondary viewers.

10. The method of claim 1, wherein the detecting the presence of the primary viewer comprises:
  determining that a viewer that initiated the outputting of the content is the primary viewer.

11. The method of claim 1, wherein one or more portions of the content are associated with metadata comprising one or more key words, and wherein the determined reaction of the one or more secondary viewers comprises a reaction determined to occur at a time that a portion of the content associated with the one or more key words is being outputted.

12. The method of claim 1, wherein the modifying the outputting of the content comprises stopping the outputting of at least a portion of the content and outputting alternative content comprising an advertisement.

13. The method of claim 1, wherein the modifying the outputting comprises outputting alternative content that comprises an advertisement, the method further comprising:
  determining, using a machine learning model, one or more estimated ages of the one or more secondary viewers; and
  determining the advertisement based on a lowest of the one or more estimated ages.

14. The method of claim 1, further comprising:
  detecting, during outputting of the content to the primary viewer, an intrusion into an environment associated with the primary viewer;
  determining a reaction of the primary viewer to the intrusion; and
  based on the reaction of the primary viewer to the intrusion, and based on determining that metadata associated with the content comprises one or more key words associated with one or more predefined types of content, generating additional metadata indicating that the content is provocative and a time associated with the reaction of the primary viewer to the intrusion.

15. A method comprising:
  detecting, during outputting of content to a primary viewer and based on first data received from one or more sensors, a first intrusion into an environment associated with the primary viewer;
  determining, based on second data received from one or more sensors, a reaction of the primary viewer to the first intrusion; and
  in response to the first intrusion, based on the reaction of the primary viewer, and based on determining that metadata associated with the content comprises one or more key words associated with one or more predefined types of content, modifying the outputting of the content.

16. The method of claim 15, wherein the metadata comprises one or more of:
  a transcript corresponding to speech in the content or
  a description of one or more non-speech portions of the content.

17. The method of claim 15, wherein the first intrusion comprises one or more of:
  another person coming within a predefined distance of the primary viewer,
  a door opening, or
  a light being turned on or off.

18. A method comprising:
  determining, during outputting of content, based on data received from one or more sensors, a reaction of a primary viewer that indicates a first presence of one or more secondary viewers of the content; and
  in response to the first presence, modifying, based on the determined reaction satisfying one or more criteria, the outputting of the content.

19. The method of claim 18, wherein the one or more sensors comprise a heart-rate sensor configured to detect a heart-rate of the primary viewer, and wherein the reaction of the primary viewer that indicates the first presence of one or more secondary viewers is based on fluctuations of the heart-rate of the primary viewer.

20. The method of claim 18, wherein the one or more sensors comprise a camera, and wherein the reaction of the primary viewer that indicates the first presence of one or more secondary viewers comprises the primary viewer gazing away from the content being outputted for greater than a threshold amount of time.

\* \* \* \* \*